United States Patent
Yagi et al.

(10) Patent No.: US 8,043,519 B2
(45) Date of Patent: Oct. 25, 2011

(54) THIN FILM SUPPORT SUBSTRATE FOR USE IN HYDROGEN PRODUCTION FILTER AND PRODUCTION METHOD OF HYDROGEN PRODUCTION FILTER

(75) Inventors: Hiroshi Yagi, Shinjuku-ku (JP); Takanori Maeda, Shinjuku-ku (JP); Yoshinori Oota, Shinjuku-ku (JP); Yasuhiro Uchida, Shinjuku-ku (JP)

(73) Assignee: Dai Nippon Insatsu Kabushiki Kaisha, Tokyo (JP)

( * ) Notice: Subject to any disclaimer, the term of this patent is extended or adjusted under 35 U.S.C. 154(b) by 636 days.

(21) Appl. No.: 12/124,181

(22) Filed: May 21, 2008

(65) Prior Publication Data

US 2008/0230517 A1    Sep. 25, 2008

Related U.S. Application Data

(62) Division of application No. 11/304,677, filed on Dec. 16, 2005, now Pat. No. 7,399,423, which is a division of application No. 10/491,888, filed as application No. PCT/JP03/09330 on Jul. 23, 2003, now Pat. No. 7,112,287.

(30) Foreign Application Priority Data

Jul. 25, 2002  (JP) ................................. 2002-216348
Jul. 31, 2002  (JP) ................................. 2002-222415
Sep. 30, 2002  (JP) ................................. 2002-285738

(51) Int. Cl.
  *B31D 3/00*    (2006.01)
  *B44C 1/22*    (2006.01)

(52) U.S. Cl. ................. 216/56; 216/17; 216/18; 216/41; 216/58; 205/80; 205/241; 205/261; 205/291; 428/131; 96/4

(58) Field of Classification Search .................... 216/17, 216/18, 41, 56, 58; 205/80, 241, 261, 291; 428/131; 96/4
See application file for complete search history.

(56) References Cited

U.S. PATENT DOCUMENTS
3,505,180 A    4/1970  Brodgden
(Continued)

FOREIGN PATENT DOCUMENTS
JP    1-131004    5/1989
(Continued)

OTHER PUBLICATIONS

U.S. Appl. No. 12/124,240, filed May 21, 2008, Yagi, et al.
(Continued)

*Primary Examiner* — Shamim Ahmed
(74) *Attorney, Agent, or Firm* — Oblon, Spivak, McClelland, Maier & Neustadt, L.L.P.

(57) ABSTRACT

In a through hole closing process, a metal plate is attached to one surface of a conductive base member having a plurality of through holes by the use of a magnet, in a copper plating process, a copper plating layer is formed on the conductive base member and the metal plate exposed within the through holes, from the side of the conductive base member where the metal plate is not attached, thereby to fill up the through holes, in a film forming process, a Pd alloy film is formed by plating on the surface of the conductive base member after removal of the metal plate, and in a removal process, the copper plating layer is removed by selective etching, thereby to produce a hydrogen production filter that is used in a reformer a fuel cell so as to be capable of stably producing high purity hydrogen gas.

8 Claims, 10 Drawing Sheets

U.S. PATENT DOCUMENTS

| | | | |
|---|---|---|---|
| 5,651,900 A * | 7/1997 | Keller et al. ............... 216/56 |
| 5,753,014 A * | 5/1998 | Van Rijn ..................... 96/12 |
| 5,824,435 A | 10/1998 | Kawano et al. |
| 6,171,512 B1 | 1/2001 | Sakaguchi et al. |
| 6,494,937 B1 | 12/2002 | Edlund et al. |
| 6,890,617 B1 | 5/2005 | Yamaguchi et al. |
| 6,911,573 B2 | 6/2005 | Chen et al. |
| 6,994,902 B2 | 2/2006 | Fukunaga et al. |
| 7,241,396 B2 | 7/2007 | Yagi et al. |
| 2002/0004180 A1 * | 1/2002 | Hotta et al. ............. 430/311 |
| 2007/0175764 A1 | 8/2007 | Yagi et al. |

FOREIGN PATENT DOCUMENTS

| | | |
|---|---|---|
| JP | 4-326931 | 11/1992 |
| JP | 5-53527 | 8/1993 |
| JP | 5-317662 | 12/1993 |
| JP | 11-104472 | 4/1999 |
| JP | 11-286785 | 10/1999 |

OTHER PUBLICATIONS

U.S. Appl. No. 12/831,416, filed Jul 7, 2010, Yagi, et al.

* cited by examiner

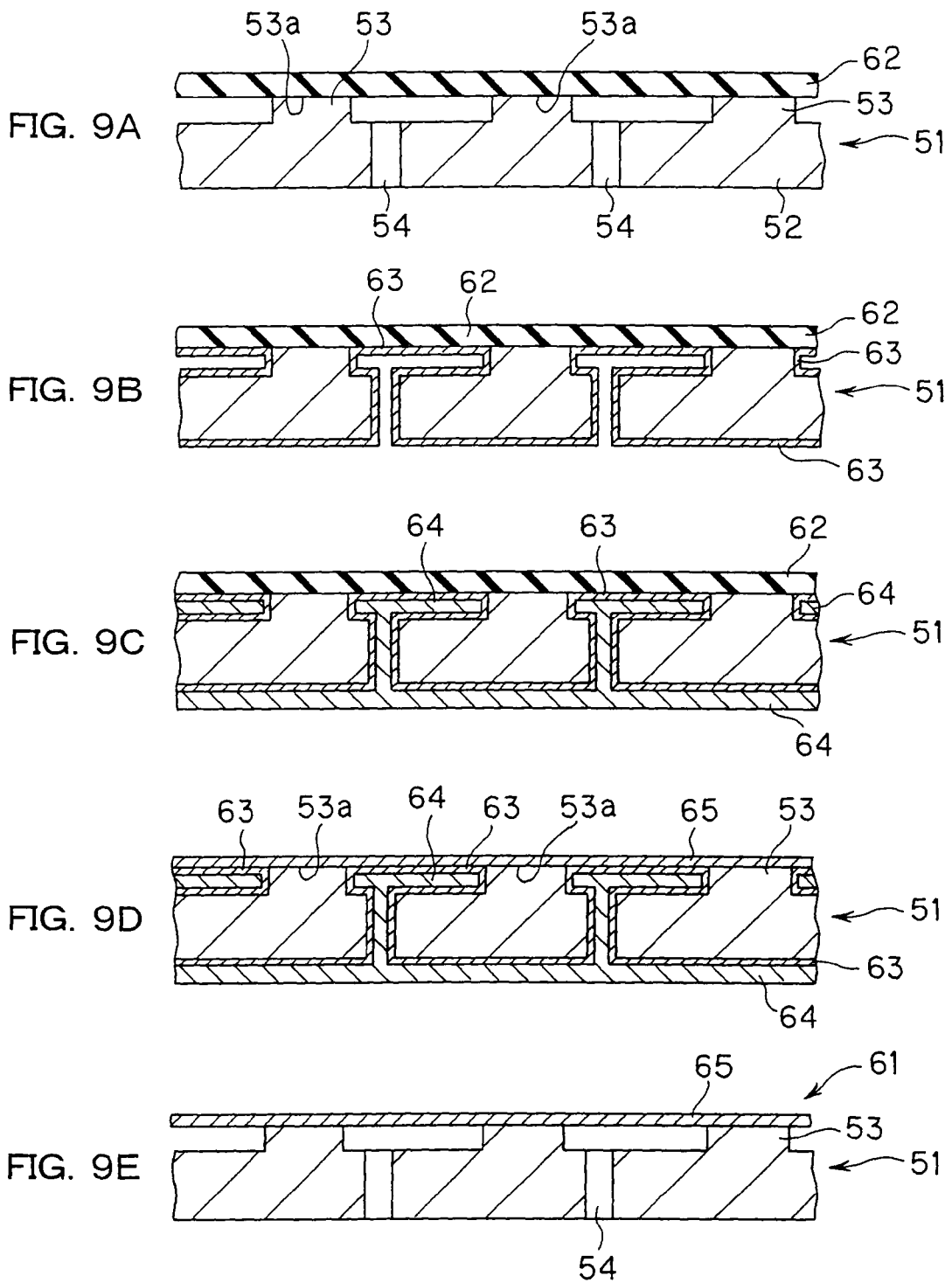

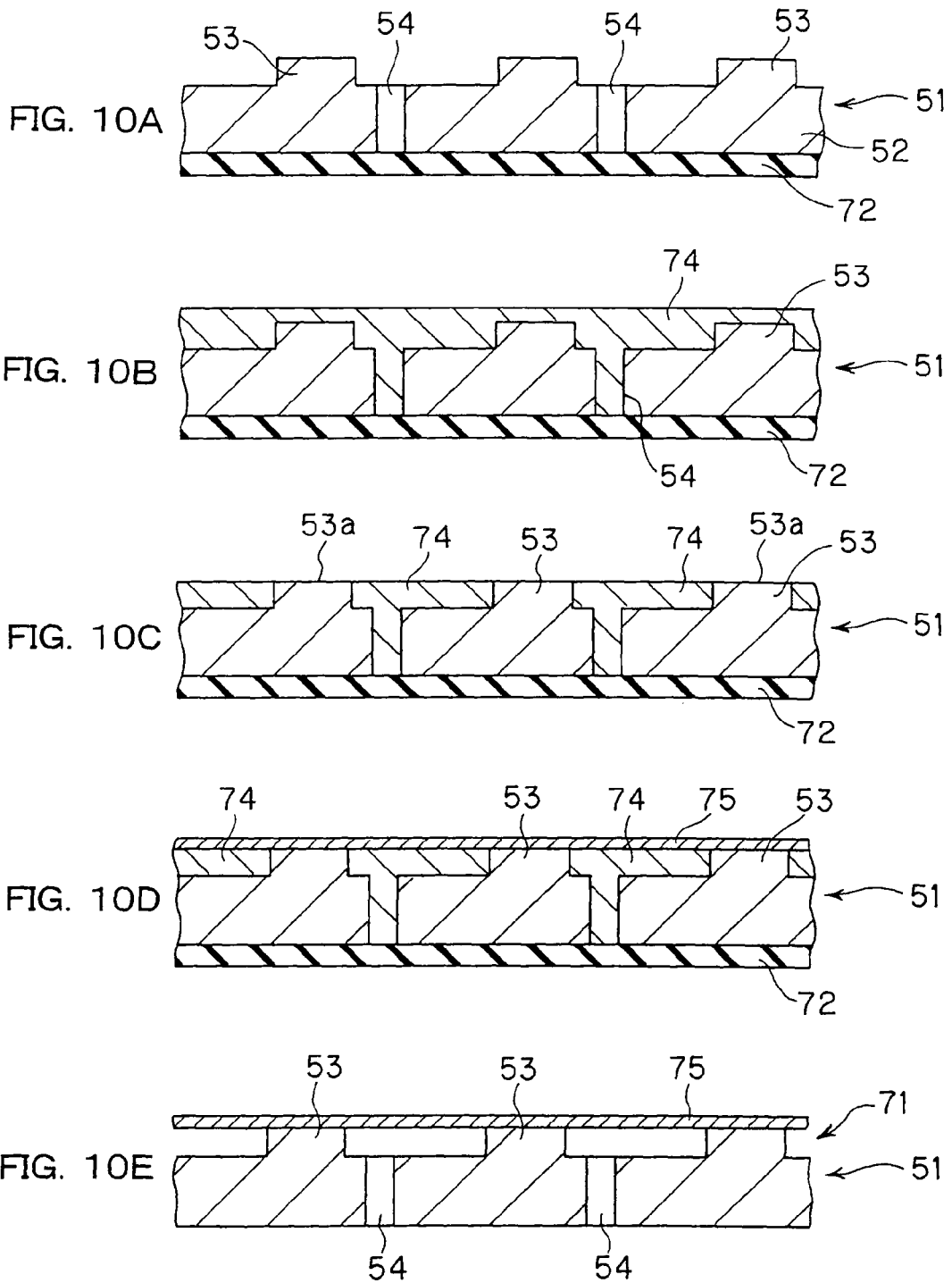

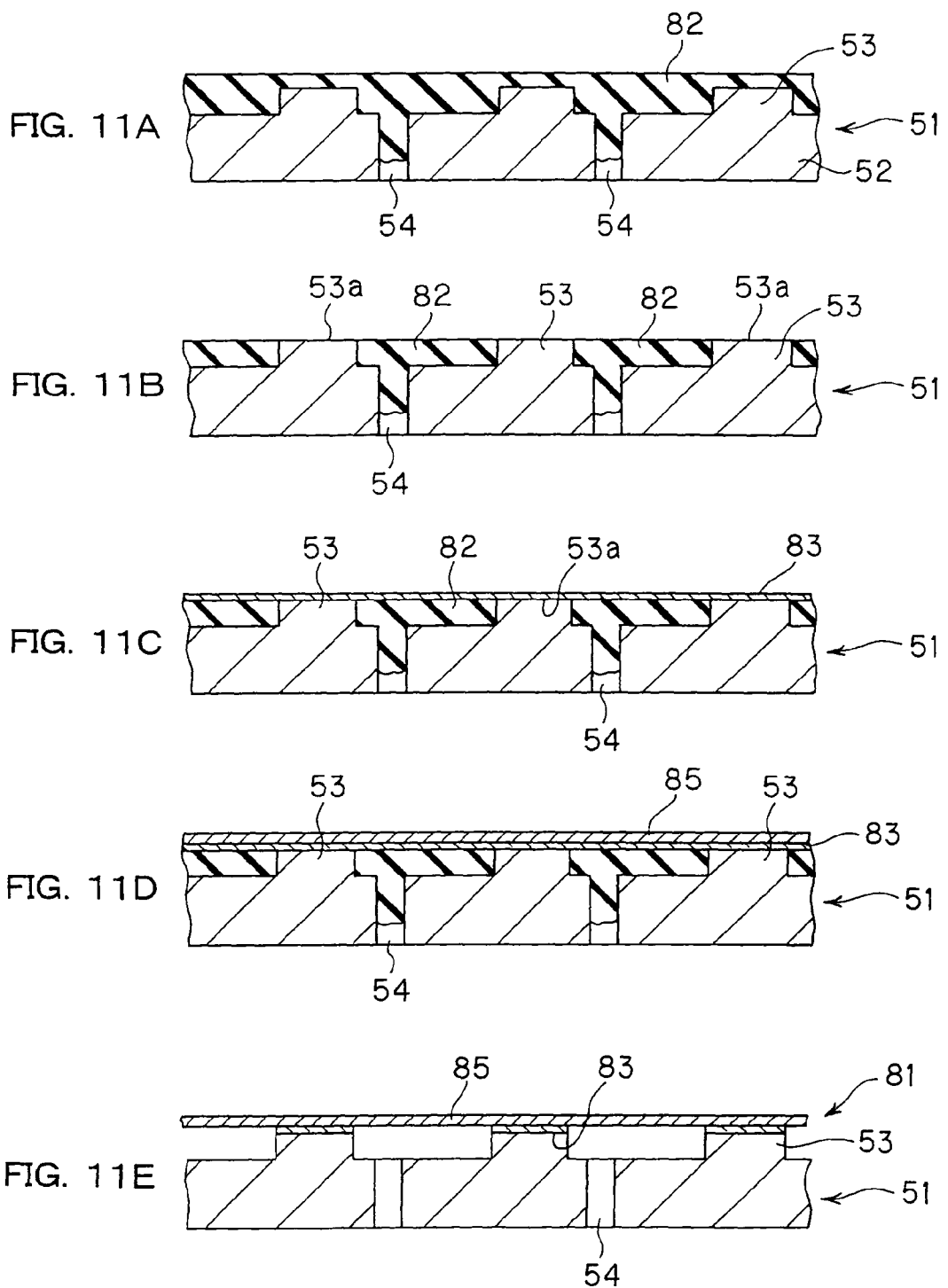

THIN FILM SUPPORT SUBSTRATE FOR USE IN HYDROGEN PRODUCTION FILTER AND PRODUCTION METHOD OF HYDROGEN PRODUCTION FILTER

This application is a divisional application of U.S. application Ser. No. 11/304,677, filed Dec. 16, 2005, now U.S. Pat. No. 7,399,423, which is a divisional application of U.S. application Ser. No. 10/491,888, filed Apr. 15, 2004, now U.S. Pat. No. 7,112,287, which is a 371 of PCT/JP03/09330, filed Jul. 23, 2003.

TECHNICAL FIELD

The present invention relates to a production method of a hydrogen production filter and, in particular, relates to a production method of a hydrogen production filter for steam-reforming hydrocarbon fuel of various kinds to produce hydrogen rich gas for a fuel cell.

Further, the present invention relates to a thin film support substrate for use in a hydrogen production filter, particularly a hydrogen production filter for steam-reforming hydrocarbon fuel of various kinds to produce hydrogen rich gas for a fuel cell, and a production method of a hydrogen production filter using such a thin film support substrate.

BACKGROUND ART

In recent years, attention has been paid to using hydrogen as fuel because there is no generation of global warming gas such as carbon dioxide from the aspect of the global environmental protection and the energy efficiency is high. Particularly, inasmuch as fuel cells can directly convert hydrogen into electric power and enable high energy conversion efficiency in cogeneration systems utilizing generated heat, attention has been paid thereto. Heretofore, the fuel cells have been employed under a special condition such as in the space development or the ocean development. Recently, however, the development has been advanced toward using them as automobile or household distributed power supplies. Further, fuel cells for portable devices have also been developed.

The fuel cell is a power generator wherein hydrogen rich gas obtained by reforming hydrocarbon fuel such as natural gas, gasoline, butane gas, or methanol, and oxygen in the air are reacted electrochemically, thereby to directly produce electricity. In general, the fuel cell comprises a reformer for producing hydrogen rich gas by steam-reforming hydrocarbon fuel, a fuel cell body for producing electricity, a converter for converting the produced dc electricity into alternating current, and so forth.

Depending on an electrolyte used in the fuel cell body, a reaction manner, and so forth, there are five kinds in those fuel cells, i.e. a phosphoric acid fuel cell (PAFC), a molten carbonate fuel cell (MCFC), a solid oxide fuel cell (SOFC), an alkaline fuel cell (AFC), and a solid polymer fuel cell (PEFC). Among them, the solid polymer fuel cell (PEFC) has a favorable condition in that an electrolyte is solid, as compared with other fuel cells such as the phosphoric acid fuel cell (PAFC) and the alkaline fuel cell (AFC).

However, since the solid polymer fuel cell (PEFC) uses platinum as a catalyst and an operating temperature thereof is low, there is a drawback that the electrode catalyst is poisoned with a small quantity of CO, and degradation in performance is remarkable particularly in a high current density region. Therefore, it is necessary to produce high purity hydrogen by reducing a concentration of CO contained in reformed gas (hydrogen rich gas) produced in a reformer, to about 10 ppm.

As one of methods for removing CO from the reformed gas, there has been used a membrane separation method employing a Pd alloy film as a filter. Unless there are pinholes, cracks, or the like in the film, the Pd alloy film can theoretically transmit only hydrogen and, by setting the reformed gas side under high-temperature and high-pressure conditions (e.g. 300° C., 3 to 100 kg/cm$^2$), it transmits hydrogen to the low hydrogen partial pressure side.

In the foregoing membrane separation method, inasmuch as the transmission speed of hydrogen is inversely proportional to a film thickness, reduction in film thickness is required. However, in terms of the mechanical strength, reduction in film thickness up to about 30 μm is a limit for a Pd alloy film alone, and therefore, when a Pd alloy film having a thickness of about ten-odd micrometers is used, a support member having a porous structure is disposed on the low hydrogen partial pressure side of the Pd alloy film. However, since the Pd alloy film and the support member are mounted in a reformer as separate members, there has been a problem that the operability for achieving excellent sealing is bad, and durability of the Pd alloy film is not sufficient due to occurrence of friction between the Pd alloy film and the support member.

For solving the foregoing problem, there has been developed a filter in which a Pd alloy film and a support member of a porous structure are unified together using an adhesive. However, there has been a problem that it is necessary to remove the adhesive from the Pd alloy film located at hole portions of the support member, and therefore, the production processes are complicated. Further, since it is used under high-temperature and high-pressure conditions in the reformer, degradation of the adhesive is unavoidable, resulting in insufficient durability of the filter.

Moreover, there is a limit to the magnitude of opening diameters of hole portions in the support member for ensuring a required strength of the support member, and therefore, there is also a limit about increasing an area of the Pd alloy film that is effective for transmission of hydrogen, so that improvement in hydrogen transmission efficiency has been impeded.

DISCLOSURE OF THE INVENTION

Therefore, it is an object of the present invention to provide a production method of a hydrogen production filter that is used in a reformer of a fuel cell so as to be capable of stably producing high purity hydrogen gas.

For accomplishing such an object, the present invention is configured to comprise a through hole closing step of attaching a metal plate to one surface of a conductive base member having a plurality of through holes by the use of a magnet, a copper plating step of forming a copper plating layer on the conductive base member and said metal plate exposed within the through holes, from the side of said conductive base member where said metal plate is not attached, thereby to fill up said through holes, a film forming step of forming a Pd alloy film by plating on the surface of said conductive base member after removal of said metal plate, and a removal step of removing said copper plating layer by selective etching.

Further, the present invention is configured to comprise a sticking step of sticking an insulating film to one surface of a conductive base member having a plurality of through holes, a copper plating step of forming a copper plating layer on a surface of said conductive base member where said insulating film is not stuck, so as to fill up said through holes, a film forming step of forming a Pd alloy film by plating on the surface of the conductive base member after removal of said insulating film, and a removal step of removing said copper plating layer by selective etching.

Further, the present invention is configured to comprise a filling step of filling a resin material into through holes of a conductive base member having the plurality of through holes, an underlayer forming step of forming a Pd alloy film on one surface of said conductive base member by either of electroless plating and a vacuum film forming method, thereby to form a conductive underlayer, a film forming step of forming a Pd alloy film by plating on said conductive underlayer, and a removal step of dissolving and removing only said resin material.

Further, the present invention is configured to comprise an etching step of forming predetermined resist patterns on both surfaces of a conductive base member, and etching said conductive base member from both sides using said resist patterns as masks to form a plurality of through holes, a film forming step of forming a Pd alloy film by electrolytic plating so as to close the inside of said through holes of said conductive base member, and a removal step of removing said resist patterns.

In the present invention as described above, even if the Pd alloy film is thin, since it is fixed to the conductive base member with a high strength so as to be unified together, durability of the filter becomes extremely high. Therefore, according to the present invention, the Pd alloy film formed by plating is fixed to the conductive base member having a plurality of through holes, with a high strength so as to be unified together, and no adhesive is used, and thus, it is excellent in heat resistance and can be used under high-temperature and high-pressure conditions. Further, even if the Pd alloy film is reduced in thickness to increase the hydrogen transmission efficiency, it is possible to produce a hydrogen production filter that is excellent in durability and further in operability upon mounting thereof to a reformer, and so forth.

It is an object of the present invention to provide a thin film support substrate enabling a hydrogen production filter that is used in a reformer of a fuel cell so as to be capable of stably producing high purity hydrogen gas, and a production method of a hydrogen production filter using such a thin film support substrate.

For accomplishing such an object, the present invention is configured to be a thin film support substrate for use in a hydrogen production filter, comprising a metal substrate, a plurality of columnar convex portions formed on one surface of said metal substrate, and a plurality of through holes formed at a portion where said columnar convex portions are not formed, so as to pierce the metal substrate, wherein an area of the columnar convex portion non-formed portion occupying on the columnar convex portion formed side is within the range of 20 to 90%.

Further, the present invention is configured to comprise, in a production method of a hydrogen production filer using the foregoing thin film support substrate, a disposing step of disposing an insulating film on a surface of said thin film support substrate where the columnar convex portions are formed, so as to fix the insulating film to the top surfaces of said columnar convex portions, an underlayer forming step of forming a conductive underlayer by electroless plating on said thin film support substrate excluding the top surfaces of said columnar convex portions and on a fixation side of said insulating film, a copper plating step of forming a copper plating layer on said conductive underlayer so as to fill up a space formed between the metal substrate of said thin film support substrate and said insulating film, and the inside of the through holes of said thin film support substrate, a film forming step of forming a Pd alloy film by plating on a surface formed by the top surfaces of said columnar convex portions and said copper plating layer after removal of said insulating film, and a removal step of removing said copper plating layer by selective etching.

Further, the present invention is configured to comprise, in a production method of a hydrogen production filer using the foregoing thin film support substrate, a disposing step of disposing an insulating film on a surface of said thin film support substrate which is on an opposite side relative to a surface where the columnar convex portions are formed, a copper platen step of forming a copper plating layer on the surface of said thin film support substrate where the columnar convex portions are formed, so as to fill up the inside of said through holes and cover said columnar convex portions, a flattening step of flat-removing said copper plating layer so as to expose top surfaces of said columnar convex portions and form the same flat surface with said top surfaces, a film forming step of forming a Pd alloy film by plating on the flat surface formed by the top surfaces of said columnar convex portions and said copper plating layer, and a removal step of removing the copper plating layer by selective etching after removal of said insulating film.

Further, the present invention is configured to comprise, in a production method of a hydrogen production filer using the foregoing thin film support substrate, a resin layer forming step of forming a resin layer on a surface of said thin film support substrate where the columnar convex portions are formed, so as to fill up the inside of the through holes and cover said columnar convex portions, a flattening step of flat-removing said resin layer so as to expose top surfaces of said columnar convex portions and form the same flat surface with said top surfaces, an underlayer forming step of forming a conductive underlayer by either of electroless plating and a vacuum film forming method on the flat surface formed by the top surfaces of said columnar convex portions and said resin layer, a film forming step of forming a Pd alloy film by plating on said conductive underlayer, and a removal step of dissolving and removing only said resin layer.

Further, the present invention is configured to comprise, in a production method of a hydrogen production filer using the foregoing thin film support substrate, a film forming step of forming a Pd alloy film by plating on one surface of a metal base member that is capable of selective etching relative to said thin film support substrate, a diffusion joining step of disposing said metal base member on a surface of said thin film support substrate where the columnar convex portions are formed, by diffusion joining said Pd alloy film to the top surfaces of the columnar convex portions, and a removal step of removing said metal base member by selective etching.

According to the present invention, since the thin film support substrate is provided with the metal substrate, even if the area ratio of the columnar convex portion non-formed portion occupying on the columnar convex portion formed side is increased, the thin film support substrate has a high strength, and therefore, the area of the Pd alloy film effective for the hydrogen transmission can be increased so that the hydrogen transmission efficiency can be improved. Further, in the production method of the present invention using such a thin film support substrate of the present invention, since the Pd alloy film formed by plating is fixed to the top surfaces of the columnar convex portions of the thin film support substrate having the through holes, with a high strength so as to be unified together, it is possible to produce a hydrogen production filter that has a large effective hydrogen transmission area, that is excellent in heat resistance and can be used under high-temperature and high-pressure conditions because no adhesion is used, that is excellent in durability even if the Pd alloy film is reduced in thickness to increase the hydrogen transmission efficiency, and that is excellent in operability upon mounting thereof to a reformer, and so forth.

BRIEF DESCRIPTION OF THE DRAWINGS

FIGS. 9A to 9E are process diagrams showing one embodiment of a production method of a hydrogen production filter of the present invention.

FIGS. 10A to 10E are process diagrams showing another embodiment of a production method of a hydrogen production filter of the present invention.

FIGS. 11A to 11E are process diagrams showing another embodiment of a production method of a hydrogen production filter of the present invention.

BEST MODE FOR CARRYING OUT THE INVENTION

Hereinafter, embodiments of the present invention will be described.

FIGS. 1A to 1D are process diagrams showing one embodiment of a production method of a hydrogen production filter of the present invention.

Figure 1A:
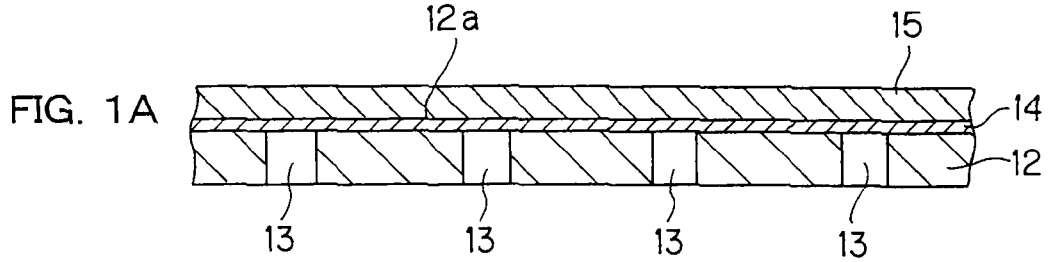
FIGS. 1A to 1D are process diagrams showing one embodiment of a production method of a hydrogen production filter of the present invention.

In the production method of the present invention, at the outset, in a through hole closing process, a metal plate 14 is attached, by the use of a magnet 15, to one surface 12a of a conductive base member 12 having a plurality of through holes 13, thereby to close the through holes 13 (FIG. 1A). As a material of the conductive base member 12, there can be cited one having conductivity such as an Fe—Cr material being ferrite stainless that is fixable to a magnet like SUS430, and a thickness can be suitably set within the range of 20 to 500 μm, preferably 50 to 300 μm. The through holes 13 are formed by means such as etching via a predetermined resist pattern, punching, laser processing, or the like. The opening size of each through hole 13 can be set within the range of 10 to 500 μm, preferably 50 to 300 μm, and the sum of opening areas of the plurality of through holes 13 relative to the whole area of the conductive base member 12 can be set within the range of 5 to 75%, preferably 10 to 50%. Incidentally, the foregoing opening size is a diameter when an opening shape of the through hole 13 is circular, while it is the mean between a maximum opening portion and a minimum opening portion when an opening shape thereof is polygonal or the like. Hereinafter, the same shall apply in the present invention.

As the foregoing metal plate 14, there can be used one having conductivity and being ferromagnetic or soft magnetic, and there can be cited an Fe—Cr material or an Fe—C material being ferrite stainless that is fixable to a magnet like SUS430, or an Fe—Cr—Ni material or the like that is not fixable to a magnet like SUS304. A thickness of such a metal plate 14 can be suitably set taking into account a material thereof, magnetic charge of the using magnet 15, or the like, and can be set to, for example, about 20 to 500 μm.

As the magnet 15 that is used for attaching the metal plate 14 onto the conductive base member 12, a permanent magnet, an electromagnet, or the like in the form of a film or plate can be used.

Figure 1B:
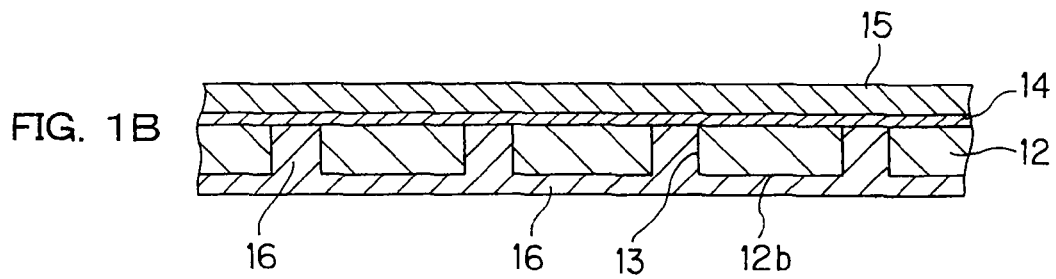

Then, in a copper plating process, copper plating is applied to a conductive base member surface 12b where the metal plate 14 is not attached, so as to form a copper plating layer 16 on the conductive base member surface 12b and on the metal plate 14 exposed in the through holes 13, thereby filling up the through holes 13 (FIG. 1B). This copper plating process aims for filling up the through holes 13 with the copper plating, and therefore, there is no particular limitation to a thickness and a shape of the copper plating layer 16 formed on the conductive base member surface 12b.

Figure 1C:
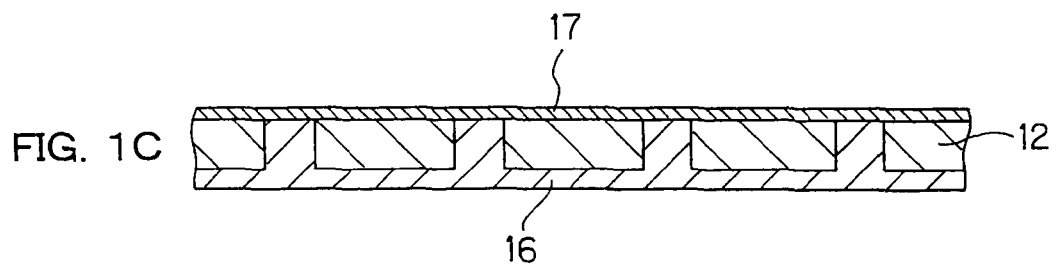

Then, in a film forming process, the foregoing metal plate 14 and magnet 15 are removed, and a Pd alloy film 17 is formed by plating on the conductive base member surface 12a after the removal (FIG. 1C). The formation of the Pd alloy film 17 can be achieved by a method in which a Pd alloy film is directly formed by electrolytic plating, a method in which thin films of respective components composing a Pd alloy are stacked in layers on the conductive base member surface 12a by electrolytic plating or electroless plating, then a heat treatment is implemented to form a Pd alloy film by diffusion of the components, or the like. For example, by forming Pd in a thickness of 10 μm by plating, forming thereon Ag in a thickness of 1 μm by plating, then applying a heat treatment at 250° C. for 10 minutes, a Pd alloy can be obtained. On the other hand, a heat treatment may be implemented after carrying out multilayer plating of three layers composed of Pd/Ag/Pd, four layers composed of Pd/Ag/Pd/Ag, or the like. A thickness of the Pd alloy thin film 17 can be set to 0.5 to 30 μm, preferably about 1 to 15 μm.

Incidentally, by applying Ni strike plating or the like to the conductive base member surface 12a before forming the Pd alloy film 17, it is possible to increase adhesion relative to the Pd alloy film 17 to be formed. A thickness of such Ni strike plating can be set within the range of, for example, 0.01 to 0.5 μm.

Figure 1D:
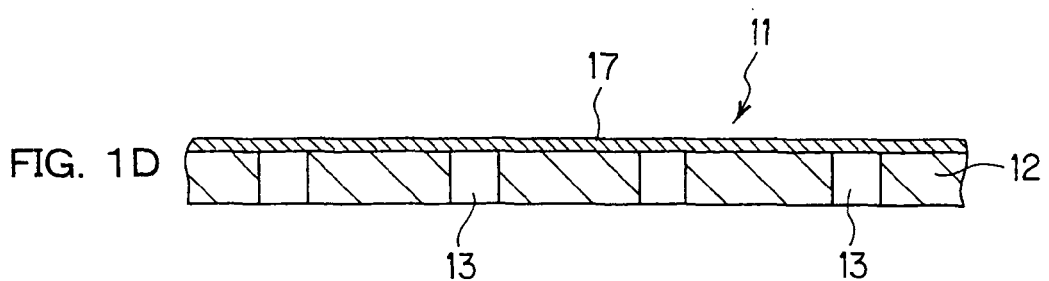

Then, in a removal process, the copper plating layer 16 is removed by selective etching, thereby to obtain a hydrogen production filter 11 (FIG. 1D). The selective etching can be carried out by spraying, dipping, blowing, or the like using an ammonia etching liquid.

In the hydrogen production filter 11 thus produced, the Pd alloy film 17 is fixed to the conductive base member 12 with a high strength, and therefore, even if the Pd alloy film is reduced in thickness for increasing the hydrogen transmission efficiency, it is a filter with remarkably high durability. Further, since no adhesive is used, it is excellent in heat resistance and can be used under high-temperature and high-pressure conditions, and further, it is also excellent in operability such as mounting thereof to a reformer.

FIGS. 2A to 2D are process diagrams showing another embodiment of a production method of a hydrogen production filter of the present invention.

Figure 2A:
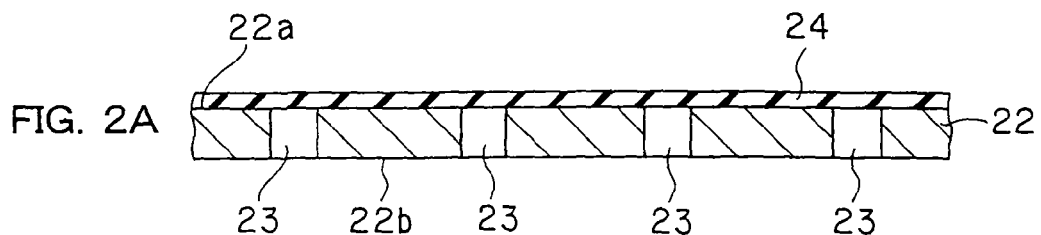
FIGS. 2A to 2D are process diagrams showing another embodiment of a production method of a hydrogen production filter of the present invention.

In the production method of the present invention, at the outset, in a sticking process, an insulating film 24 is stuck onto one surface 22a of a conductive base member 22 having a plurality of through holes 23 (FIG. 2A). As a material of the conductive base member 22, there can be cited austenite or ferrite stainless such as SUS304 or SUS430, or the like, and a thickness can be suitably set within the range of 20 to 500 µm, preferably 50 to 300 µm. The through holes 23 are formed by means such as etching via a predetermined resist pattern, punching, laser processing, or the like. The opening size of each through hole 23 can be set within the range of 10 to 500 µm, preferably 50 to 300 µm, and the sum of opening areas of the plurality of through holes 23 relative to the whole area of the conductive base member 22 can be set within the range of 5 to 75%, preferably 10 to 50%. Incidentally, the foregoing opening size is a diameter when an opening shape of the through hole 23 is circular, while it is the mean between a maximum opening portion and a minimum opening portion when an opening shape thereof is polygonal or the like. Hereinafter, the same shall apply in the present invention.

As the foregoing insulating film 24, a film of resin such as polyethylene terephthalate, polypropylene, or polycarbonate can be used. A thickness of such an insulating film 24 can be suitably set taking into account a material, electrical insulation performance, a film strength, and so forth, and can be set to, for example, about 30 to 300 µm. Sticking of the insulating film 24 onto the conductive base member 22 can be carried out by a method of using a polyamide or other adhesive, a method of utilizing thermal adhesiveness of the insulating film, or the like.

Figure 2B:
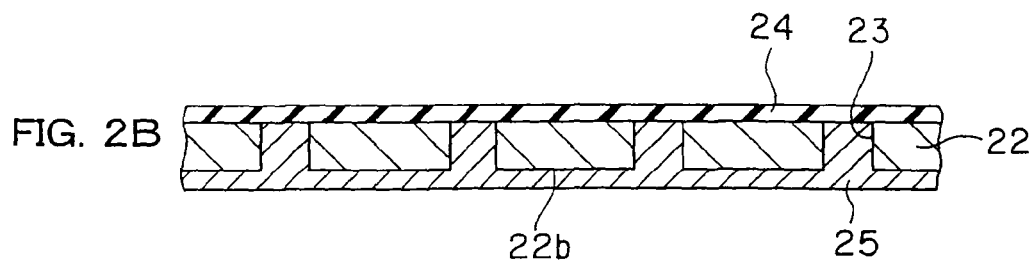

Then, in a copper plating process, copper plating is applied to a conductive base member surface 22b where the insulating film 24 is not stuck, so as to form a copper plating layer 25 to thereby fill up the through holes 23 (FIG. 2B). This copper plating process aims for fill up the through holes 23 with the copper plating, and therefore, there is no particular limitation to a thickness and a shape of the copper plating layer 25 formed on the conductive base member surface 22b.

Figure 2C:
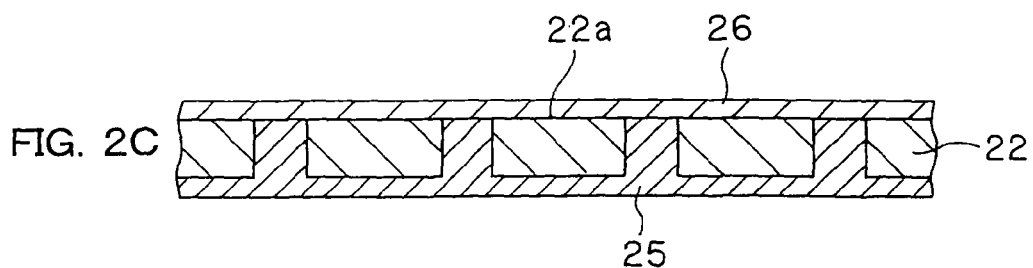

Then, in a film forming process, the foregoing insulating film 24 is removed, and a Pd alloy film 26 is formed by plating on the conductive base member surface 22a after the removal (FIG. 2C). The removal of the insulating film 24 can be carried out by peeling or dissolution. Further, the formation of the Pd alloy film 26 can be achieved by a method in which a Pd alloy film is directly formed by electrolytic plating, a method in which thin films of respective components composing a Pd alloy are stacked in layers on the conductive base member surface 22a by electrolytic plating or electroless plating, then a heat treatment is implemented to form a Pd alloy film by diffusion of the components, or the like. For example, by forming Pd in a thickness of 10 µm by plating, forming thereon Ag in a thickness of 1 µm by plating, then applying a heat treatment at 900° C. for 10 hours, a Pd alloy can be obtained. On the other hand, a heat treatment may be implemented after carrying out multilayer plating of three layers composed of Pd/Ag/Pd, four layers composed of Pd/Ag/Pd/Ag, or the like. A thickness of the Pd alloy thin film 26 to be formed can be set to 0.5 to 30 µm, preferably about 1 to 15 µm.

Incidentally, for example, by applying Ni strike plating to the conductive base member surface 22a, it is possible to increase adhesion relative to the Pd alloy film 26 to be formed. A thickness of such Ni strike plating can be set within the range of, for example, 0.01 to 0.1 µm.

Figure 2D:
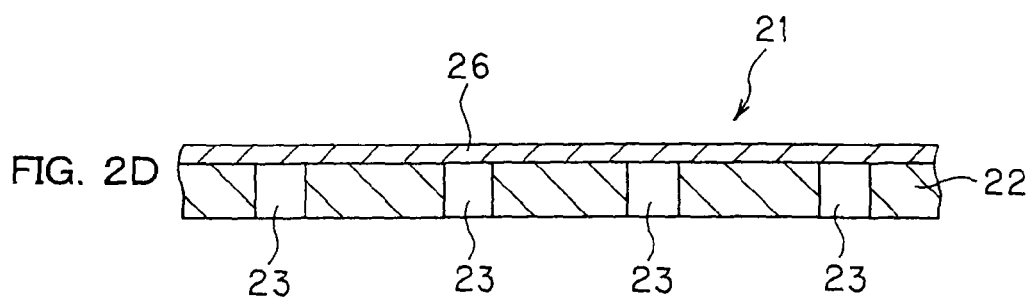

Then, in a removal process, the copper plating layer 25 is removed by selective etching, thereby to obtain a hydrogen production filter 21 (FIG. 2D). The selective etching can be carried out by spraying, dipping, blowing, or the like using an ammonia etching liquid.

In the hydrogen production filter 21 thus produced, the Pd alloy film 26 is fixed to the conductive base member 22 with a high strength, and therefore, even if the Pd alloy film is reduced in thickness for increasing the hydrogen transmission efficiency, it is a filter with remarkably high durability. Further, since no adhesive is used, it is excellent in heat resistance and can be used under high-temperature and high-pressure conditions, and further, it is also excellent in operability such as mounting thereof to a reformer.

FIGS. 3A to 3D are process diagrams showing another embodiment of a production method of a hydrogen production filter of the present invention.

Figure 3A:
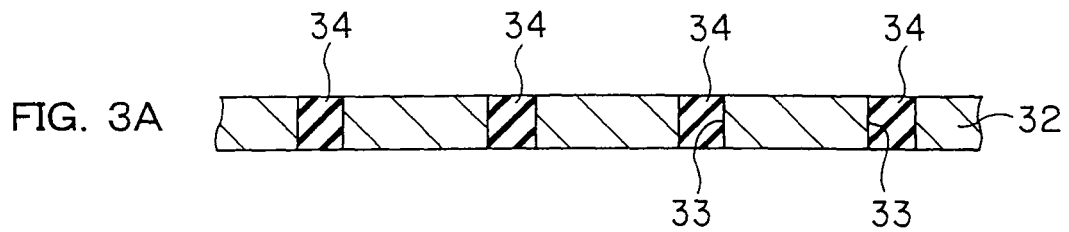
FIGS. 3A to 3D are process diagrams showing another embodiment of a production method of a hydrogen production filter of the present invention.

First, in a filling process, a resin material 34 is filled in a plurality of through holes 33 provided in a conductive base member 32 (FIG. 3A). A material and a thickness of the conductive base member 32 can be the same as those of the foregoing conductive base member 22, and a forming method, dimensions, and a formation density of the through holes 33 can also be the same as those of the foregoing through holes 23. Further, the conductive base member 32 may be applied with, for example, Ni strike plating after the formation of the through holes 33, thereby to increase adhesion relative to a Pd alloy film formed in a subsequent process. A thickness of such Ni strike plating can be set within the range of, for example, 0.01 to 0.1 µm.

The foregoing resin material can exhibit stable resistance in later-described underlayer forming process and film forming process and can be surely dissolved/removed in a removal process and, for example, novolak resist resin or the like can be used therefor. For filling such a resin material into the through holes 33, a method such as squeezing or the like can be employed.

Figure 3B:
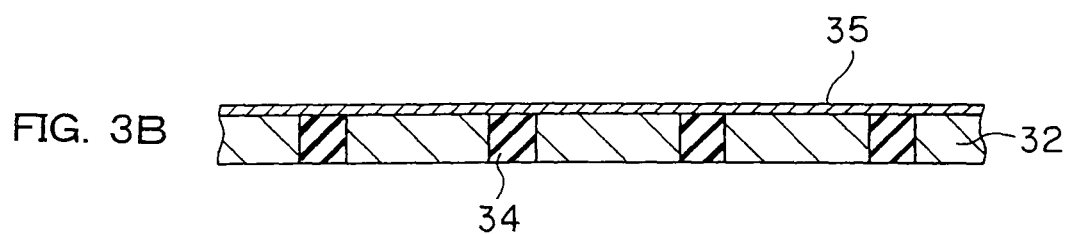

Then, in the underlayer forming process, a Pd alloy film is formed on one surface of the conductive base member 32 in which the resin material 34 is filled in the through holes 33, thereby to form a conductive underlayer 35 (FIG. 3B). This underlayer forming process aims for giving conductivity to exposed surfaces of the resin material 34 filled in the through holes 33, and a thickness of the conductive underlayer 35 to be formed can be set within the range of 0.01 to 0.2 µm. The Pd alloy film to be the conductive underlayer 35 can be formed by electroless plating, or may be formed by a vacuum film forming method such as sputtering or vacuum deposition.

Figure 3C:
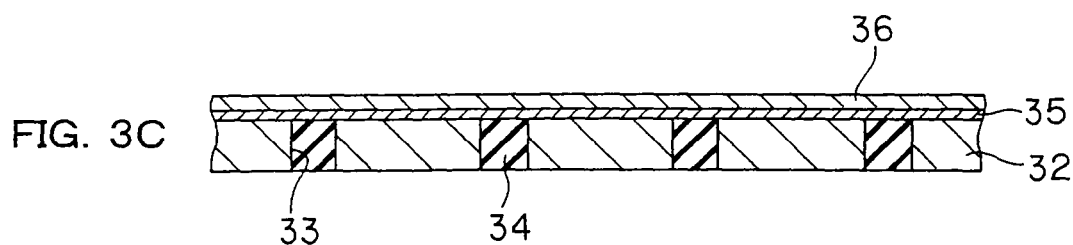

Then, in the film forming process, a Pd alloy film 36 is formed on the conductive underlayer 35 by plating (FIG. 3C). The formation of this Pd alloy film 36 can be achieved by a method in which a Pd alloy film is directly formed by electrolytic plating, a method in which thin films of respective components composing a Pd alloy are stacked in layers on the conductive underlayer 35 by electrolytic plating or electroless plating, then a heat treatment is implemented to form a Pd alloy film by diffusion of the components, or the like. A thickness of the Pd alloy thin film 36 to be formed can be set to 0.5 to 30 µm, preferably about 1 to 15 µm.

Figure 3D:
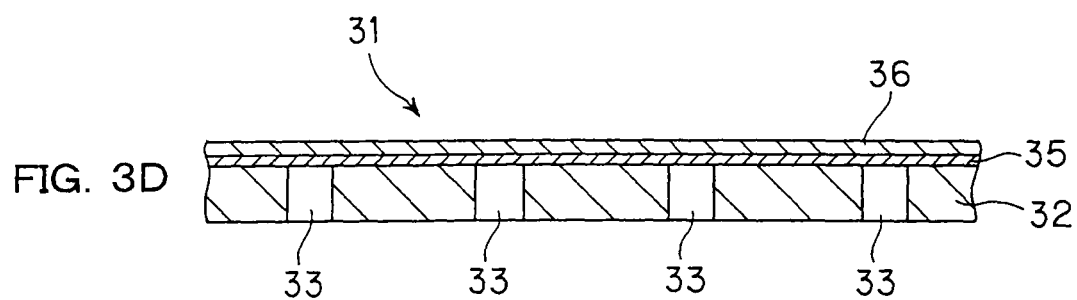

Then, in the removal process, only the resin material 34 is dissolved to be removed, thereby to obtain a hydrogen production filter 31 (FIG. 3D). The dissolution/removal of the resin material 34 can be carried out by spraying, dipping, or the like using a solvent such as acetone, methyl ethyl ketone, methyl isobutyl ketone, or the like, a desmear solution (manufactured by Shipley Corporation), or the like depending on the resin material to be used.

In the hydrogen production filter 31 thus produced, the Pd alloy film 36 is fixed to the conductive base member 32 with a high strength via the conductive underlayer 35, and therefore, even if the Pd alloy film is reduced in thickness for increasing the hydrogen transmission efficiency, it is a filter with remarkably high durability. Further, since no adhesive is used, it is excellent in heat resistance and can be used under high-temperature and high-pressure conditions, and further, it is also excellent in operability such as mounting thereof to a reformer.

FIGS. 4A to 4D are process diagrams showing another embodiment of a production method of a hydrogen production filter of the present invention.

Figure 4A:
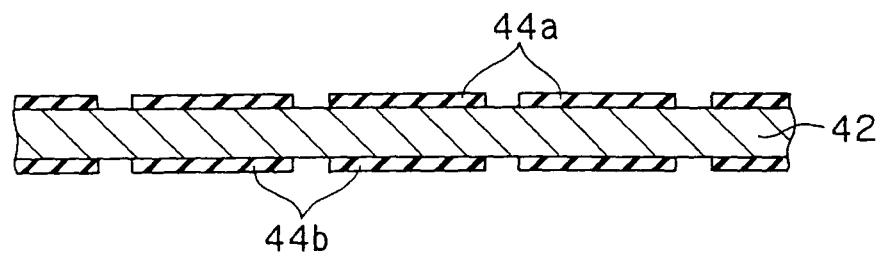
FIGS. 4A to 4D are process diagrams showing another embodiment of a production method of a hydrogen production filter of the present invention.

In the production method of the present invention, in an etching process, at the outset, resist patterns 44a and 44b having a plurality of small opening portions are formed on both surfaces of a conductive base member 42 (FIG. 4A). The small opening portions of the resist pattern 44a confront the small opening portions of the resist pattern 44b, respectively, via the conductive base member 42, and opening areas of the mutually confronting small opening portions may be equal to each other, or one of them, for example, the opening area of the small opening portion of the resist pattern 44b, may be set greater. The shapes and sizes of the small opening portions of such resist patterns 44a and 44b can be suitably set taking into account an etching condition, a material and a thickness of the conductive base member 42, and so forth. The material and thickness of the conductive base member 42 can be the same as those of the foregoing conductive base member 22. Further, the resist patterns 44a and 44b can be each formed by applying a material selected from conventionally known positive and negative photosensitive resist materials, exposing it via a predetermined mask, and developing it.

Figure 4B:
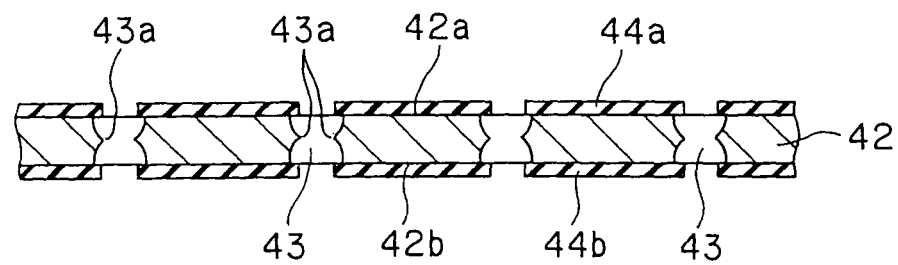

Then, by etching the conductive base member 42 using the foregoing resist patterns 44a and 44b as masks, a plurality of fine through holes 43 are formed in the conductive base member 42 (FIG. 4B). The etching of the conductive base member 42 can be carried out by spraying, dipping, blowing, or the like by the use of an etching liquid of iron chloride, copper chloride, or the like. The opening size on the side of a conductive base member surface 42a and the opening size on the side of a conductive base member surface 42b, of each through hole 43 formed in the conductive base member 42 by the etching can be set within the range of 10 to 500 μm, preferably 50 to 300 μm, and the sum of opening areas of the plurality of through holes 43 relative to the whole area of the conductive base member 42 can be set within the range of 5 to 75%, preferably 10 to 50%. Incidentally, upon etching the conductive base member 42 from both surfaces using the resist patterns 44a and 44b as masks, a projected portion 43a is generally formed at a substantially central portion of an inner wall surface of each formed through hole 43. Therefore, when such a projected portion 43a exists, the foregoing opening area of the through hole 43 is an opening area at the projected portion 43a.

Figure 4C:
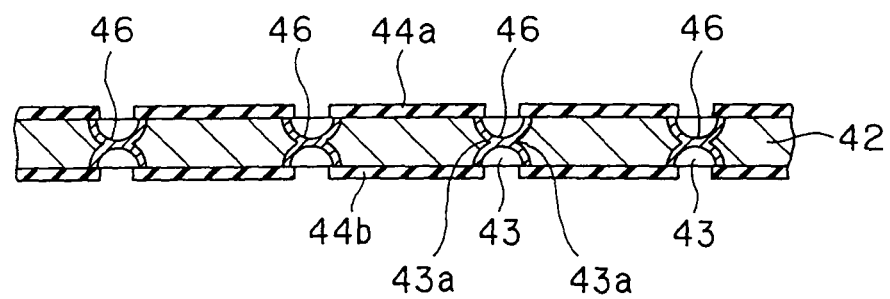

Then, in a film forming process, Pd alloy films 46 are formed by electrolytic plating so as to close the inside of the through holes 43 of the conductive base member 42 (FIG. 4C). The formation of the Pd alloy films 46 can be achieved, using the resist patterns 44a and 44b as masks, according to a method in which Pd alloy films are directly formed by electrolytic plating, a method in which thin films of respective components composing a Pd alloy are formed by electrolytic plating, then a heat treatment is implemented to form Pd alloy films by diffusion of the components, or the like. In the formation of such a Pd alloy film 46, when the projected portion 43a exists at the substantially central portion of the inner wall surface of the through hole 43 formed in the foregoing etching process, the current density increases at the projected portion 43a so that the Pd alloy film is formed so as to close the projected portion 43a. A thickness of the Pd alloy thin film 46 to be formed can be set to 0.5 to 30 μm, preferably about 1 to 15 μm. Further, by applying Ni strike plating to the inside of the through holes 43 of the conductive base member 42 before forming the foregoing Pd alloy films, it is possible to increase adhesion relative to the Pd alloy films. A thickness of such Ni strike plating can be set within the range of, for example, 0.01 to 0.1 μm.

Figure 4D:
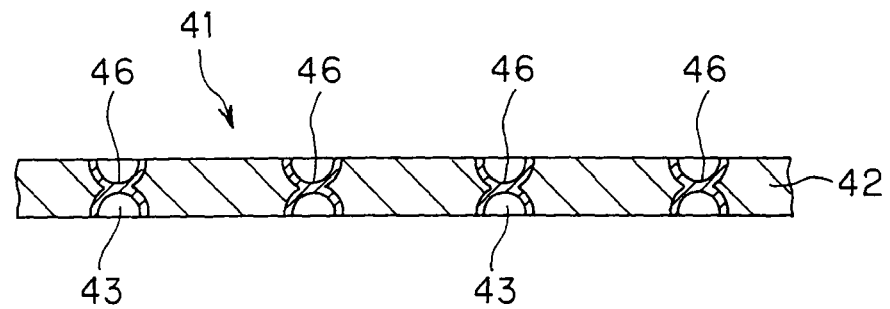

Then, in a removal process, the resist patterns 44a and 44b are removed to thereby obtain a hydrogen production filter 41 (FIG. 4D). The removal of the resist patterns 44a and 44b can be carried out using a sodium hydroxide solution or the like.

In the hydrogen production filter 41 thus produced, the Pd alloy films 46 are fixed to the conductive base member 42 with a high strength so as to close the through holes 43, and therefore, even if the Pd alloy films are reduced in thickness for increasing the hydrogen transmission efficiency, it is a filter with remarkably high durability. Further, since no adhesive is used, it is excellent in heat resistance and can be used under high-temperature and high-pressure conditions, and further, it is also excellent in operability such as mounting thereof to a reformer.

Figure 5:
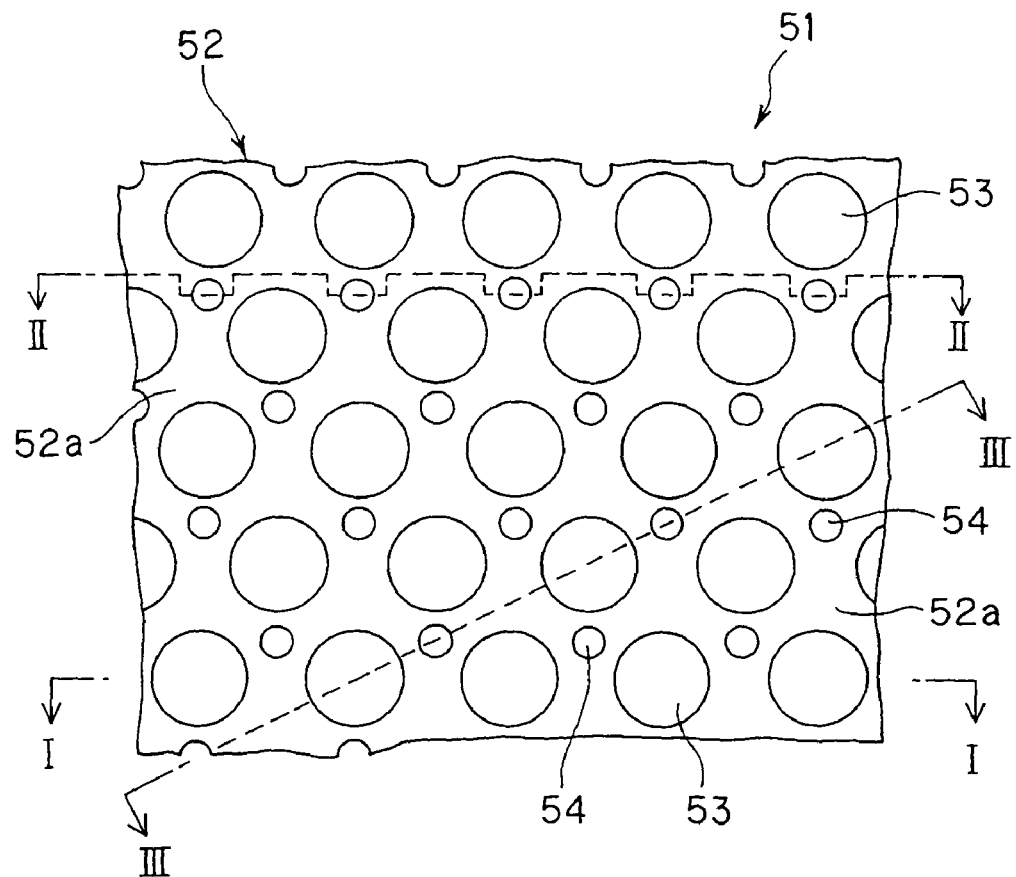
FIG. 5 is a plan view showing one embodiment of a thin film support substrate of the present invention.
Figure 6:
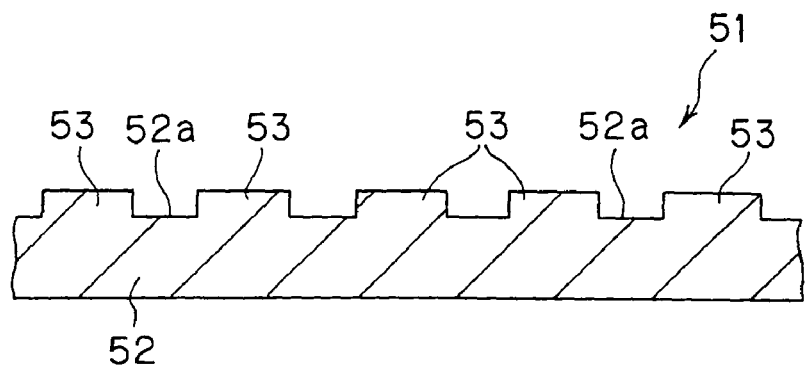
FIG. 6 is a longitudinal sectional view, taken along line I-I, of the thin film support substrate shown in FIG. 5.
Figure 7:
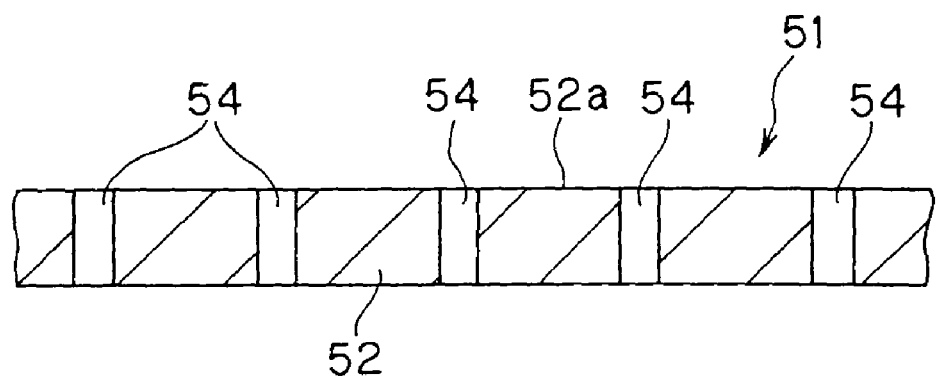
FIG. 7 is a longitudinal sectional view, taken along line II-II, of the thin film support substrate shown in FIG. 5.
Figure 8:
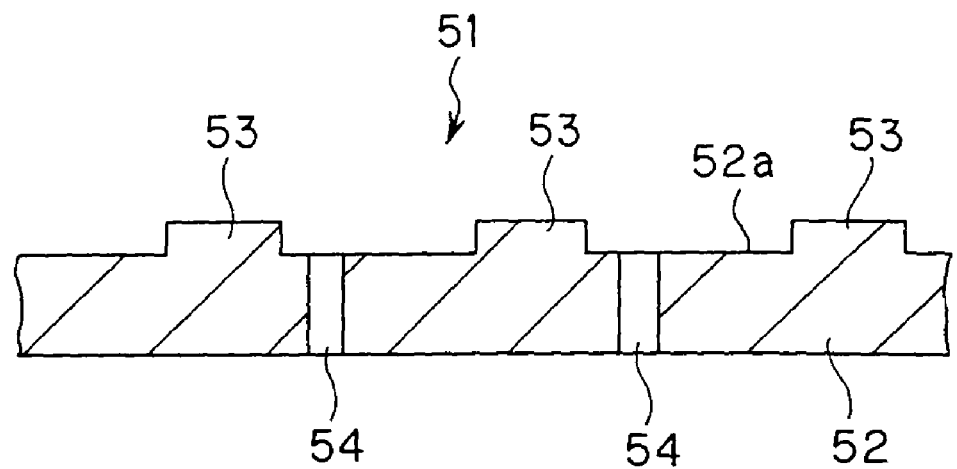
FIG. 8 is a longitudinal sectional view, taken along line III-III, of the thin film support substrate shown in FIG. 5.

FIG. 5 is a plan view showing one embodiment of a thin film support substrate of the present invention, FIG. 6 is a longitudinal sectional view, taken along line I-I, of the thin film support substrate shown in FIG. 5, FIG. 7 is a longitudinal sectional view, taken along line II-II, of the thin film support substrate shown in FIG. 5, and FIG. 8 is a longitudinal sectional view, taken along line III-III, of the thin film support substrate shown in FIG. 5. In FIGS. 5 to 8, a thin film support substrate 51 comprises a metal substrate 52, a plurality of columnar convex portions 53 formed in predetermined positions of one surface of the metal substrate 52, and a plurality of through holes 54 formed in predetermined positions of a portion 52a where the columnar convex portions 53 are not formed, so as to pierce the metal substrate 52. An occupying area of the columnar convex portion non-formed portion 52a on the side where the columnar convex portions 53 are formed, is within the range of 20 to 90%, preferably 30 to 85%. When the area of the columnar convex portion non-formed portion 52a is less than 20%, an effect of increasing an area of a Pd alloy film effective for the hydrogen transmission does not become sufficient, while, when it exceeds 90%, supporting of the hydrogen transmission film is impeded to lower durability of a hydrogen production filer, which is not preferable.

A material of the metal substrate 52 forming the thin film support substrate 51 may be, for example, austenite or ferrite stainless such as SUS304 or SUS430. A thickness of the metal substrate 52 (a thickness at the columnar convex portion non-formed portion 52a) can be suitably set within the range of 20 to 300 μm. If the thickness of the metal substrate 52 is less than 20 μm, the strength of the thin film support substrate 51 becomes insufficient, while, if it exceeds 300 μm, there occurs an evil influence of increase in weight, and it becomes difficult to form the through holes 54, which is not preferable.

Diameters of the columnar convex portions 53 forming the thin film support substrate 51 can be each set within the range of 20 to 500 μm, preferably 30 to 300 μm, and the formation pitch thereof can be set within the range of 40 to 700 μm, preferably 60 to 520 μm, thereby to set the area of the columnar convex portion non-formed portion 52a to occupy 20 to 90% as described above. Further, a height of each columnar convex portion 53 can be set within the range of 10 to 200 μm, preferably 20 to 150 μm. The columnar convex portion has a cylindrical shape in the shown example, but is not limited thereto. Such columnar convex portions 53 can be formed by, for example, half-etching the metal substrate from one surface via a resist pattern having a plurality of required opening portions.

An opening diameter of each through hole 54 forming the thin film support substrate 51 can be set within the range of 20 to 200 μm, preferably 50 to 150 μm. On the other hand, if inner diameters of the through hole 54 are not uniform, the minimum inner diameter is set to be the opening diameter. The thin film support substrate 51 of the present invention is formed with a Pd alloy film on top surfaces 53a of the columnar convex portions 53 to thereby constitute a hydrogen production filter, and the side of the through holes 54 become the low hydrogen partial pressure side. Therefore, the formation density of the through holes 54 is sufficient as long as it is within a range not giving an influence on the strength of the metal substrate 52. For example, a ratio of A/B per unit area between the number A of the columnar convex portions 53 and the number B of the through holes 54 can be set to about 1 to 10. Such through holes 54 can be formed by, for example, etching the metal substrate 52 from both surfaces via resist patterns each having a plurality of required opening portions.

In the shown example, the columnar convex portions 53 and the through holes 54 are formed such that a triangle having as its vertexes the centers of the nearest three columnar convex portions 53 forms a regular triangle, a triangle having as its vertexes the centers of the nearest three through holes 54 forms a regular triangle, and the vertex of one of the regular triangles is located in a position of the center of gravity of the other regular triangle, however, not limited thereto.

Since the foregoing thin film support substrate 51 of the present invention is provided with the metal substrate 52, even if the area ratio of the columnar convex portion non-formed portion 52a occupying on the side where the columnar convex portions 53 are formed is increased, the required strength can be maintained, and therefore, the area of the Pd alloy film effective for the hydrogen transmission can be increased.

Now, description will be given about a production method of a hydrogen production filter of the present invention using the thin film support substrate of the present invention.

FIGS. 9A to 9E are process diagrams showing one embodiment of a production method of a hydrogen production filter of the present invention using the foregoing thin film support substrate 51.

In the production method of the present invention, at the outset, in a disposing process, an insulating film 62 is disposed on the surface of the thin film support substrate 51 where the columnar convex portions 53 are formed, so as to be fixed to the top surfaces 53a of the columnar convex portions 53 (FIG. 9A). As the insulating film 62, for example, a film of resin such as polyethylene terephthalate, polypropylene, or polycarbonate can be used. A thickness of such an insulating film 62 can be suitably set taking into account a material, electrical insulation performance, a film strength, and so forth, and can be set to, for example, about 30 to 300 μm. Fixation of the insulating film 62 onto the top surfaces 53a of the columnar convex portions 53 can be carried out by, for example, a method of using a polyamide or other adhesive, a method of utilizing thermal adhesiveness of the insulating film, or the like. On the other hand, as the insulating film, a dry film resist may be disposed. By using the dry film resist, later-described removal of the insulating film 62 can be carried out using a peeling liquid such as an alkaline aqueous solution and, as compared with the case of using the foregoing resin film, it is advantageous that there is no physical damage to the thin film support substrate 51. When a photosensitive dry film resist is used as the insulating film, fixation onto the top surfaces 53a of the columnar convex portions 53 can be carried out by a method wherein the whole surface is exposed after roll laminating or vacuum laminating and, if necessary, hot curing is implemented, or the like.

Then, in an underlayer forming process, a conductive underlayer 63 is formed by electroless plating on the thin film support substrate 51 excluding the top surfaces 53a of the columnar convex portions 53 (including the inside of the through holes 54), and on the fixation side of the insulating film 62 (FIG. 9B). The formation of this conductive underlayer 63 can be performed by electroless nickel plating, electroless copper plating, or the like, and a thickness of the conductive underlayer 63 can be set within the range of about 0.01 to 0.2 μm. The condition of this electroless plating is suitably set depending on a material of the insulating film 62 to be used.

Then, in a copper plating process, a copper plating layer 64 is formed on the conductive underlayer 63 so as to fill up spaces formed between the metal substrate 52 of the thin film support substrate 51 and the insulating film 62, and the inside of the through holes 54 of the thin film support substrate 51 (FIG. 9C).

Then, in a film forming process, the insulating film 62 is removed, and thereafter, a Pd alloy film 65 is formed by plating on a surface formed by the top surfaces 53a of the columnar convex portions 53 and the copper plating layer 64 (conductive underlayer 63) (FIG. 9D). The removal of the insulating film 62 can be carried out by peeling or dissolution. Further, the formation of the Pd alloy film 65 can be achieved by a method in which a Pd alloy film is directly formed by electrolytic plating, a method in which thin films of respective components composing a Pd alloy are stacked in layers by electrolytic plating or electroless plating, then a heat treatment is implemented to form a Pd alloy film by diffusion of the components, or the like. For example, by forming Pd in a thickness of 10 μm by plating, forming thereon Ag in a thickness of 1 μm by plating, then applying a heat treatment at 250° C. for 10 minutes, a Pd alloy can be obtained. On the other hand, a heat treatment may be implemented after carrying out multilayer plating of three layers composed of Pd/Ag/Pd, four layers composed of Pd/Ag/Pd/Ag, or the like. A thickness of the Pd alloy thin film 65 to be formed can be set to 0.5 to 30 μm, preferably about 1 to 15 μm.

Then, in a removal process, the copper plating layer 64 (conductive underlayer 63) is removed by selective etching, thereby to obtain a hydrogen production filter 61 (FIG. 9E). The selective etching can be carried out by spraying, dipping, blowing, or the like using an ammonia etching liquid.

FIGS. 10A to 10E are process diagrams showing another embodiment of a production method of a hydrogen production filter of the present invention.

First, in a disposing process, an insulating film 72 is disposed on the surface of the thin film support substrate 51, which is on the opposite side relative to the surface where the columnar convex portions 53 are formed (FIG. 10A). As the insulating film 72, one that is the same as the foregoing insulating film 62 can be used, and a disposing method of the insulating film 72 can be the same as that of the foregoing insulating film 62.

Then, in a copper plating process, a copper plating layer 74 is formed on the surface of the thin film support substrate 51 where the columnar convex portions 53 are formed, so as to fill up the inside of the through holes 54 and cover the columnar convex portions 53 (FIG. 10B).

Then, in a flattening process, the copper plating layer 74 is flat-removed so as to expose the top surfaces 53a of the columnar convex portions 53 and form the same flat surface with the top surfaces 53a (FIG. 10C). The flat removal of the copper plating layer 74 can be carried out by, for example, mechanical grinding or the like.

Then, in a film forming process, a Pd alloy film 75 is formed by plating on the flat surface formed by the top surfaces 53a of the columnar convex portions 53 and the copper plating layer 74 (FIG. 10D). The formation of this Pd alloy film 75 can be performed like the formation of the foregoing Pd alloy film 65.

Then, in a removal process, the insulating film 72 is removed, and thereafter, the copper plating layer 74 is removed by selective etching, thereby to obtain a hydrogen production filter 71 (FIG. 10E). The removal of the insulating film 72 can be carried out like the removal of the foregoing insulating film 62. Further, the removal of the copper plating layer 74 can also be carried out like the removal of the foregoing copper plating layer 64.

In the foregoing example, the insulating film 72 is removed in the removal process. However, it may also be configured that the insulating film 72 is removed before the flattening process and, after the flattening process, the insulating film 72 is again disposed, before the film forming process, on the surface of the thin film support substrate 51 which is on the opposite side relative to the surface where the columnar convex portions 53 are formed, and then removed in the removal process.

FIGS. 11A to 11E are process diagrams showing another embodiment of a production method of a hydrogen production filter of the present invention.

First, in a resin layer forming process, a resin layer 82 is formed on the surface of the thin film support substrate 51 where the columnar convex portions 53 are formed, so as to fill up the inside of the through holes 54 and cover the columnar convex portions 53 (FIG. 11A). The resin layer 82 can be formed by, for example, pouring a monomer solution of thermosetting resin such as epoxy resin, bismaleimide resin, or phenol resin by squeezing or the like, and hot curing it at a predetermined curing temperature.

Then, in a flattening process, the resin layer 82 is flat-removed so as to expose the top surfaces 53a of the columnar convex portions 53 and form the same flat surface with the top surfaces 53a (FIG. 11B). The flat removal of the resin layer 82 can be carried out by, for example, mechanical grinding or the like.

Then, in an underlayer forming process, a conductive underlayer 83 is formed on the flat surface formed by the tope surfaces 53a of the columnar convex portions 53 and the resin layer 82, by either electroless plating or a vacuum film forming method (FIG. 1C). When forming the conductive underlayer 83 by electroless plating, it can be carried out by electroless nickel plating, electroless copper plating, or the like, and a thickness of the conductive underlayer 83 can be set within the range of about 0.01 to 0.2 μm. The condition of this electroless plating is suitably set depending on a material of the resin layer 82. On the other hand, when forming the conductive underlayer 83 by the vacuum film forming method, a thin film of Ni, Cu, Ag, Pd, or the like can be formed, and a thickness of this thin film can be set within the range of about 0.01 to 0.2 μm.

Then, in a film forming process, a Pd alloy film 85 is formed by plating on the conductive underlayer 83 (FIG. 1D). The formation of this Pd alloy film 85 can be implemented like the formation of the foregoing Pd alloy film 65.

Then, in a removal process, only the resin layer 82 is dissolved to be removed, thereby to obtain a hydrogen production filter 81 (FIG. 1E). The removal of the resin layer 82 can be carried out using an organic solvent or the like that can dissolve the resin layer 82. In the removal of the resin layer 82, the conductive underlayer 83 is removed so as to expose a surface of the Pd alloy film 85 on the side of the thin film support substrate 51. The removal of the conductive underlayer 83 can be implemented by a hydrogen peroxide/sulfuric acid etching liquid when Ni is used, and by an ammonia alkaline etching liquid when Cu is used. When Ag is used, since it can be formed into an alloy with Pd due to heat diffusion, removal thereof is not necessary.

Figure 12A:
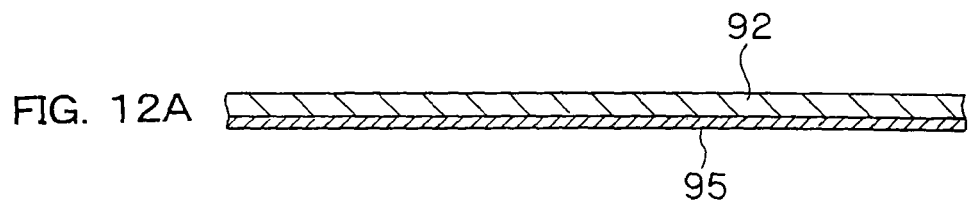
FIGS. 12A to 12C are process diagrams showing another embodiment of a production method of a hydrogen production filter of the present invention.
Figure 12B:
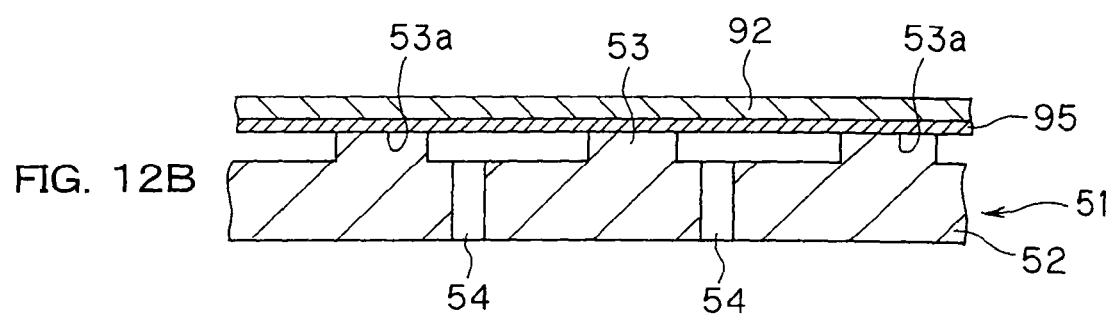
Figure 12C:
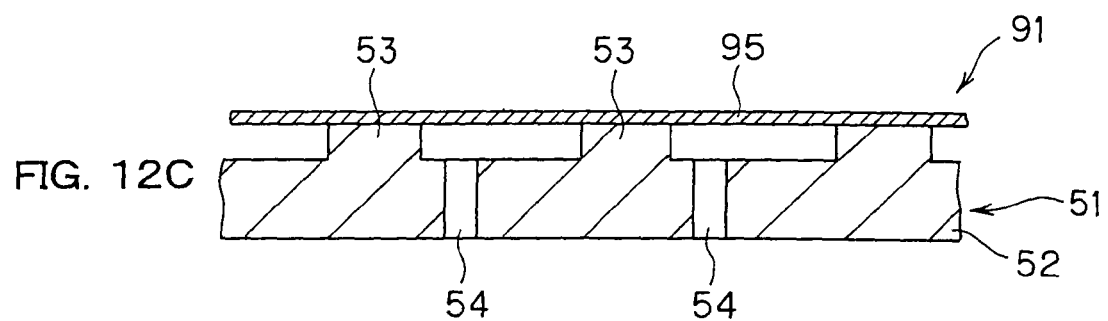

FIGS. 12A to 12C are process diagrams showing another embodiment of a production method of a hydrogen production filter of the present invention.

First, in a film forming process, a Pd alloy film 95 is formed by plating on one surface of a metal base member 92 that is capable of selective etching relative to the thin film support substrate 51 (FIG. 12A). As the foregoing metal base member 92, copper, a copper alloy, or the like can be used, and a thickness can be suitably set within the range of 0.05 to 0.3 mm. The formation of the Pd alloy film 95 can be carried out like the formation of the foregoing Pd alloy film 65. Incidentally, for example, by applying Ni strike plating to the metal base member 92, it is possible to increase adhesion relative to the Pd alloy film 95 to be formed. A thickness of such Ni strike plating can be set within the range of, for example, 0.01 to 0.1 μm.

Then, in a diffusion joining process, the metal base member 92 is disposed on the surface of the thin film support substrate 51 where the columnar convex portions 53 are formed, by diffusion joining the foregoing Pd alloy film 95 to the top surfaces 53a of the columnar convex portions 53 (FIG. 12B). The joining between the Pd alloy film 95 and the top surfaces 53a of the columnar convex portions 53 by diffusion joining can be carried out by applying a heat treatment at 900 to 1400° C. for 12 to 18 hours in a vacuum.

Then, in a removal process, the metal base member 92 is removed by selective etching, thereby to obtain a hydrogen production filter 91 (FIG. 12C). When, for example, the metal base member 92 is a copper base member, the selective etching can be carried out by spraying, dipping, blowing, or the like using an ammonia etching liquid.

Since any of the hydrogen production filters 61, 71, 81, and 91 produced as described above uses the thin film support substrate 51 of the present invention, the area of the Pd alloy film effective for the hydrogen transmission is large, and the Pd alloy film is fixed, with a high strength, to the columnar convex portions 53 of the thin film support substrate 51 having a high strength. Therefore, even if the Pd alloy film is reduced in thickness for increasing the hydrogen transmission efficiency, it is a filter with remarkably high durability. Further, since no adhesive is used, it is excellent in heat resistance and can be used under high-temperature and high-pressure conditions, and further, it is also excellent in operability such as mounting thereof to a reformer.

Now, the present invention will be described in further detail showing more specific examples.

EXAMPLE 1

Production of Filter for Hydrogen Production

A SUS430 member having a thickness of 50 μm was prepared as a base member, and a photosensitive resist material (OFPR manufactured by Tokyo Ohka Kogyo Co., Ltd.) was applied (film thickness: 7 μm (upon drying)) to both surfaces of the SUS430 member by a dip method. Then, photomasks each having, in a pitch of 200 μm, a plurality of circular opening portions each having an opening size (opening diameter) of 120 μm were disposed on the foregoing resist application films, and the resist application films were exposed via the photomasks and developed using a sodium hydrogen carbonate solution. By this, resist patterns having the circular opening portions with the opening size (opening diameter) of 120 μm were formed on both surfaces of the SUS430 member. Incidentally, the centers of the respective opening portions of the resist patterns formed on the surfaces were set to coincide with each other via the SUS430 member.

Then, the SUS430 member was etched under the following condition using the foregoing resist patterns as masks.

<Etching Condition>
  Temperature: 50° C.
  Iron chloride concentration: 45 Baume
  Pressure: 3 kg/cm$^2$ After the foregoing etching process was finished, the resist patterns were removed using a sodium hydroxide solution, and washing in water was carried out. By this, a conductive base member was obtained wherein a plurality of circular through holes were formed in the SUS430 member. The formed through holes each had a projected portion at a substantially central portion of an inner wall surface, and an opening size (opening diameter) at the projected portion was 70 μm.

Then, a metal plate (SUS430 member) having a thickness of 200 μm was attached to one surface of the foregoing SUS430 member by the use of a plate permanent magnet to thereby close the through holes. (hereinabove, the through hole closing process)

Then, electrolytic copper plating was carried out under the following condition relative to a surface of the SUS430 member where the metal plate was not attached, so as to form a copper plating layer on the surface of the SUS430 member and on the metal plate exposed within the through holes, thereby filling up the through holes with the copper plating. A thickness of the copper plating layer on the surface of the SUS430 member was set to 80 μm. (hereinabove, the copper plating process)

<Copper Plating Condition>
  Copper sulfate plating bath
  Liquid temperature: 30° C.
  Current density: 1 A/dm$^2$ Then, the metal plate and the plate permanent magnet were removed from the SUS430 member, and a Pd alloy film (thickness: 8 μm) was formed by electrolytic plating on the surface of the SUS430 member after the removal under the following condition. (hereinabove, the film forming process)

<Film Forming Condition of Pd Alloy Film by Electrolytic Plating>
  Pd chloride plating bath
  Temperature: 40° C.
  Current density: 1 A/dm$^2$ Then, the copper plating layer was removed by selective etching. (hereinabove, the removal process)

After the foregoing removal of the copper plating layer was finished, cutting into a size of 3 cm×3 cm was carried out to obtain a filter for hydrogen production.

Evaluation of Hydrogen Production Filter

The hydrogen production filter thus produced was mounted in a reformer, and a mixture of butane gas and steam was continuously supplied to the Pd alloy film of the filter under high-temperature and high-pressure conditions (300° C., 10 kg/cm$^2$), thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

COMPARATIVE EXAMPLE 1

Production of Filter for Hydrogen Production

Like in Example 1, a conductive base member was obtained by forming a plurality of through holes in a SUS430 member. Then, a Pd alloy film having a thickness of 30 μm was bonded to the conductive base member via an adhesive so as to be unified together, and thereafter, the adhesive remaining in the through holes of the conductive base member was removed using acetone. This unified composite was cut into a size of 3 cm×3 cm to obtain a filter for hydrogen production.

Evaluation of Hydrogen Production Filter

The filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations were 8 to 10 ppm, which were extremely low and thus excellent, immediately after the start of reforming up to a lapse of 300 hours. However, after the lapse of 300 hours, peeling of the Pd alloy film was caused due to degradation of the adhesive under high-temperature and high-pressure conditions, and the CO concentration was increased to about 3% due to generation of cracks of the Pd alloy film or the like, and therefore, it was confirmed that durability was bad.

EXAMPLE 2

Production of Filter for Hydrogen Production

A SUS304 member having a thickness of 50 μm was prepared as a base member, and a photosensitive resist material (OFPR manufactured by Tokyo Ohka Kogyo Co., Ltd.) was applied (film thickness: 7 μm (upon drying)) to both surfaces of the SUS304 member by a dip method. Then, photomasks each having, in a pitch of 200 μm, a plurality of circular opening portions each having an opening size (opening diameter) of 120 μm were disposed on the foregoing resist application films, and the resist application films were exposed via the photomasks and developed using a sodium hydrogen carbonate solution. By this, resist patterns having the circular opening portions with the opening size (opening diameter) of 120 μm were formed on both surfaces of the SUS304 member. Incidentally, the centers of the respective opening portions of the resist patterns formed on the surfaces were set to coincide with each other via the SUS304 member.

Then, the SUS304 member was etched under the following condition using the foregoing resist patterns as masks.

<Etching Condition>
  Temperature: 50° C.
  Iron chloride concentration: 45 Baume
  Pressure: 3 kg/cm$^2$ After the foregoing etching process was finished, the resist patterns were removed using a sodium hydroxide solution, and washing in water was carried out. By this, a conductive base member was obtained wherein a plurality of through holes were formed in the SUS304 member. The formed through holes each had a projected portion at a substantially central portion of an inner wall surface, and an opening size (opening diameter) at the projected portion was 70 μm.

Then, an insulating film having a thickness of 200 μm was stuck to one surface of the foregoing SUS304 member. (hereinabove, the sticking process)

Then, electrolytic copper plating was carried out under the following condition relative to a surface of the SUS304 member where the insulating film was not stuck, so as to fill up the through holes with the copper plating and form a copper plating layer (thickness: about 80 μm) on the surface of the SUS304 member. (hereinabove, the copper plating process)

<Copper Plating Condition>
Using bath: Copper sulfate plating bath
Liquid temperature: 30° C.
Current density: 1 A/dm$^2$ Then, the insulating film was peeled and removed from the SUS304 member, and a Pd alloy film (thickness: 8 μm) was formed by electrolytic plating on the surface of the SUS304 member after the removal under the following condition. (hereinabove, the film forming process)

<Film Forming Condition of Pd Alloy Film by Electrolytic Plating>
Using bath: Pd chloride plating bath
(Pd concentration: 12 g/L)
pH: 7 to 8
Current density: 1 A/dm$^2$
Liquid temperature: 40° C.

Then, the copper plating layer was removed by selective etching. (hereinabove, the removal process)

After the foregoing removal of the copper plating layer was finished, cutting into a size of 3 cm×3 cm was carried out to obtain a filter for hydrogen production.

Evaluation of Hydrogen Production Filter

The hydrogen production filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

EXAMPLE 3

Production of Filter for Hydrogen Production

Like in Example 2, a conductive base member was obtained by forming a plurality of through holes in a SUS304 member.

Then, Ni strike plating (thickness: 0.01 μm) was applied to the foregoing SUS304 member under the following condition, and thereafter, a resin material (AZ111 manufactured by Shipley Corporation) were filled in the through holes of the foregoing SUS304 member. The filling of the resin material was performed by squeezing. (hereinabove, the filling process)

<Ni Strike Plating Condition>

| Bath composition: | Nickel chloride | 300 g/L |
| --- | --- | --- |
| | Boric acid | 30 g/L |

-continued

<Ni Strike Plating Condition>

| pH: | 2 |
| --- | --- |
| Liquid temperature: | 55 to 65° C. |
| Current density: | 10 A/dm$^2$ |

Then, the following pretreatment was applied to one surface of the SUS304 member in which the resin material was filled in the through holes, and thereafter, electroless plating was carried out under the following condition to form an electroless Ni plating layer (thickness: 0.4 μm) on the surfaces of the resin material filled in the through holes and on the surface of the SUS304 member, thereby to obtain a conductive underlayer. (hereinabove, the underlayer forming process)

<Pretreatment>
alkaline degreasing→washing in water→chemical etching (in ammonium persulfate 200 g/L aqueous solution (20° C.±5° C.))→washing in water→acid treatment (10% dilute sulfuric acid (ordinary temperature))→washing in water→acid treatment (30% dilute hydrochloric acid (ordinary temperature))→dipping in sensitizer added liquid (composition: 0.5 g of Pd chloride, 25 g of stannous chloride, 300 mL of hydrochloric acid, 600 mL of water)→washing in water <Electroless Ni Plating Condition>

| Bath composition: | Ni sulfate | 20 g/L |
| --- | --- | --- |
| | Sodium hypophosphite | 10 g/L |
| | Lactic acid | 3 g/L |
| | Sodium citrate | 5 g/L |
| | Sodium acetate | 5 g/L |
| pH: | | 4.5 to 6.0 |
| Liquid temperature: | | 50 to 65° C. |

Then, a Pd alloy film (thickness: 8 μm) was formed by electrolytic plating on the foregoing conductive underlayer under the following condition. (hereinabove, the film forming process)

<Film Forming Condition of Pd Alloy Film by Electrolytic Plating>
Using bath: Pd chloride plating bath
(Pd concentration: 12 g/L)
pH: 7 to 8
Current density: 1 A/dm$^2$
Liquid temperature: 40° C.

Then, the resin material filled in the through holes was dissolved to be removed using the following treatment bath (Desmear Bath manufactured by Shipley Corporation). (hereinabove, the removal process)

<Treatment Condition of Desmear Bath>

| Bath composition of swelling process: | MLB-211 | 20 vol % |
| --- | --- | --- |
| | Cup-Z | 10 vol % |
| Bath temperature of swelling process: | | 80° C. |
| Bath composition of roughening process: | MLB-213A | 10 vol % |
| | MLB-213B | 15 vol % |
| Bath temperature of roughening process: | | 80° C. |

After the foregoing removal of the resin material was finished, cutting into a size of 3 cm×3 cm was carried out to obtain a filter for hydrogen production.

Evaluation of Hydrogen Production Filter

The filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

EXAMPLE 4

Production of Filter for Hydrogen Production

A filter for hydrogen production was produced like in Example 3 except that a Pd alloy film (thickness: 0.2 µm) was formed by a sputtering method under the following condition instead of the electroless plating method in the underlayer forming process, thereby to obtain a conductive underlayer.

<Sputtering Condition>
RF power: 500 W
Argon gas pressure: $5.4 \times 10^{-2}$ Pa
dc current: 2.5 A Evaluation of Hydrogen Production Filter The filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

EXAMPLE 5

Production of Filter for Hydrogen Production

Like in Example 2, a plurality of through holes were formed in a SUS304 member by etching using resist patterns as masks. However, after the etching process was finished, the resist patterns were not removed, but left on the surface of the SUS304 member. (hereinabove, the etching process)

Then, Ni strike plating (thickness: 0.2 µm) was applied under the following condition to the inside of the through holes of the foregoing SUS304 member.

| <Ni Strike Plating Condition> | | |
|---|---|---|
| Bath composition: | Nickel chloride | 300 g/L |
| | Boric acid | 30 g/L |
| pH: | | 2 |
| Liquid temperature: | | 55 to 65° C. |
| Current density: | | 10 A/dm² |

Then, a Pd alloy film (thickness: 15 µm) was formed by electrolytic plating under the following condition so as to close the inside of the through holes using the resist patterns as masks. (hereinabove, the film forming process)

<Film Forming Condition of Pd Alloy Film by Electrolytic Plating>
Using bath: Pd chloride plating bath
(Pd concentration: 12 g/L)
pH: 7 to 8
Current density: 1 A/dm²
Liquid temperature: 40° C.

Then, the resist patterns on the SUS304 member were removed using a 5% sodium hydroxide aqueous solution. (hereinabove, the removal process)

After the foregoing removal of the resist patterns was finished, cutting into a size of 3 cm×3 cm was carried out to obtain a filter for hydrogen production.

Evaluation of Hydrogen Production Filter

The filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

COMPARATIVE EXAMPLE 2

Production of Filter for Hydrogen Production

Like in Example 2, a conductive base member was obtained by forming a plurality of through holes in a SUS304 member. Then, a Pd alloy film having a thickness of 30 µm was bonded to the conductive base member via an adhesive so as to be unified together, and thereafter, the adhesive remaining in the through holes of the conductive base member was removed using acetone. This unified composite was cut into a size of 3 cm×3 cm to obtain a filter for hydrogen production.

Evaluation of Hydrogen Production Filter

The filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations were 8 to 10 ppm, which were extremely low and thus excellent, immediately after the start of reforming up to a lapse of 300 hours. However, after the lapse of 300 hours, peeling of the Pd alloy film was caused due to degradation of the adhesive under high-temperature and high-pressure conditions, and the CO concentration was increased to about 3% due to generation of cracks of the Pd alloy film or the like, and therefore, it was confirmed that durability was bad.

EXAMPLE 6

Production of Thin Film Support Substrate

A SUS304 member having a thickness of 150 µm was prepared as a base member, and a photosensitive resist material (OFPR manufactured by Tokyo Ohka Kogyo Co., Ltd.) was applied (film thickness: 7 µm (upon drying)) to both surfaces of the SUS304 member by a dip method. Then, a photomask having, in a pitch of 430 µm, a plurality of circular shading portions each having a diameter of 390 µm was disposed on the resist application film on the side of the SUS304 member where columnar convex portions are formed, and a photomask having, in a pitch of 430 μm, a plurality of circular opening portions each having an opening size (opening diameter) of 100 μm was disposed on the resist application film on the opposite side. The resist application films were exposed via the photomasks and developed using a sodium hydrogencarbonate solution. By this, circular resists each having the diameter of 390 μm were formed in the pitch of 430 μm on one surface of the SUS304 member, while a resist pattern having the circular opening portions each having the opening size (opening diameter) of 100 μm was formed on an opposite surface. Incidentally, positioning was carried out such that each vertex of a triangle having as its vertexes the centers of the nearest three circular resists (diameter: 390 μm) was located in a position of the center of gravity of a triangle having as its vertexes the centers of the nearest three opening portions of the resist pattern on the opposite side via the SUS304 member.

Then, the SUS304 member was etched under the following condition using the foregoing resist patterns as masks. This etching was for forming columnar convex portions by half etching from one surface of the SUS304 member, and simultaneously, forming through holes by etching from both surfaces, and a time required for the etching was six minutes.
<Etching Condition>
Temperature: 50° C.
Iron chloride concentration: 45 Baume
Pressure: 3 kg/cm$^2$ After the foregoing etching process was finished, the resist patterns were removed using a sodium hydroxide solution, and washing in water was carried out. By this, a thin film support substrate as shown in FIG. 5 was obtained, wherein the columnar convex portions of a cylindrical shape having a diameter of 290 μm and a height of 60 μm were formed in the pitch of 430 μm on one surface of the SUS304 member having a thickness of 90 μm, and the through holes each having an opening diameter of 70 to 100 μm were formed in the pitch of 430 μm in the SUS304 member at a portion where the columnar convex portions were not formed. In this thin film support substrate, an area of the columnar convex portion non-formed portion occupying on the side where the columnar convex portions were formed, was about 50%.

Production of Filter for Hydrogen Production

On the surface of the thus produced thin film support substrate where the columnar convex portions were formed, an insulating film (polyethylene terephthalate film) having a thickness of 200 μm was stuck to be disposed (hereinabove, the disposing process).

Then, the following pretreatment was applied to the thin film support substrate excluding top surfaces of the columnar convex portions (including the inside of the through holes) and to the sticking side of the insulting film, and thereafter, electroless plating was performed under the following condition to form an electroless nickel plating layer (thickness: 0.4 μm), thereby obtaining a conductive underlayer. (hereinabove, the underlayer forming process)
<Pretreatment>
alkaline degreasing washing in water→chemical etching (in ammonium persulfate 200 g/L aqueous solution (20° C.±5° C.))→washing in water→acid treatment (10% dilute sulfuric acid (ordinary temperature))→washing in water→acid treatment (30% dilute hydrochloric acid (ordinary temperature))→dipping in sensitizer added liquid (composition: 0.5 g of Pd chloride, 25 g of stannous chloride, 300 mL of hydrochloric acid, 600 mL of water)→washing in water

| <Electroless Nickel Plating Condition> | | |
|---|---|---|
| Bath composition: | Nickel sulfate | 20 g/L |
| | Sodium hypophosphite | 10 g/L |
| | Lactic acid | 3 g/L |
| | Sodium citrate | 5 g/L |
| | Sodium acetate | 5 g/L |
| pH: | | 4.5 to 6.0 |
| Liquid temperature: | | 50 to 65° C. |

Then, electrolytic copper plating was applied to the conductive underlayer under the following condition to form a copper plating layer so as to fill up spaces formed between the columnar convex portion non-formed surface of the thin film support substrate and the insulating film, and the inside of the through holes of the thin film support substrate. (hereinabove, the copper plating process)
<Copper Plating Condition>
Using bath: Copper sulfate plating bath
Liquid temperature: 30° C.
Current density: 1 A/dm$^2$ Then, the insulating film was peeled and removed from the thin film support substrate, and a Pd alloy film (thickness: 3 μm) was formed by electrolytic plating on the thin film support substrate (top surfaces of the columnar convex portions) and the copper plating layer after the removal under the following condition. Incidentally, upon this electrolytic plating, the copper plating layer on the back side of the thin film support substrate was covered with an insulating film. (hereinabove, the film forming process)
<Film Forming Condition of Pd Alloy Film by Electrolytic Plating>
Using bath: Pd chloride plating bath
  (Pd concentration: 12 g/L)
pH: 7 to 8
Current density: 1 A/dm$^2$
Liquid temperature: 40° C.

Then, the insulating film was peeled and removed, and further, the copper plating layer was removed by selective etching. (hereinabove, the removal process)

After the foregoing removal of the copper plating layer was finished, cutting into a size of 3 cm×3 cm was carried out to obtain a filter for hydrogen production.

Evaluation of Hydrogen Production Filter

The hydrogen production filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

EXAMPLE 7

Production of Thin Film Support Substrate

Like in Example 6, a thin film support substrate of the present invention was produced.

Production of Filter for Hydrogen Production

On the surface of the thus produced thin film support substrate which is on the opposite side relative to the columnar convex portion formed side, an insulating film (polyethylene terephthalate film) having a thickness of 200 µm was stuck to be disposed (hereinabove, the disposing process).

Then, electrolytic copper plating was applied to the surface of the thin film support substrate on the columnar convex portion formed side to form a copper plating layer (thickness: about 80 µm) on the thin film support substrate so as to fill up the inside of the through holes and cover the columnar convex portions. The copper plating condition was the same as in Example 6. (hereinabove, the copper plating process)

Then, the copper plating layer was flat-removed by grinding so as to expose the top surfaces of the columnar convex portions and form the same flat surface with the top surfaces. In this event, the ground surface was smoothed as much as possible. (hereinabove, the flattening process)

Then, a Pd alloy film (thickness: 3 µm) was formed on the foregoing flat surface. The electrolytic plating condition for this Pd alloy film was the same as in Example 6. (hereinabove, the film forming process)

Then, the insulating film was peeled and removed, and further, the copper plating layer was removed by selective etching. (hereinabove, the removal process)

After the foregoing removal of the copper plating layer was finished, cutting into a size of 3 cm×3 cm was carried out to obtain a filter for hydrogen production.

Evaluation of Hydrogen Production Filter

The hydrogen production filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

EXAMPLE 8

Production of Thin Film Support Substrate

Like in Example 6, a thin film support substrate of the present invention was produced.

Production of Filter for Hydrogen Production

A resin layer was formed on the surface of the thus produced thin film support substrate on the columnar convex portion formed side, by filling/applying a resin material (AZ1111 manufactured by Shipley Corporation) by squeezing so as to fill up the inside of the through holes and cover the columnar convex portions. (hereinabove, the resin layer forming process)

Then, the resin layer was flat-removed by grinding so as to expose the top surfaces of the columnar convex portions and form the same flat surface with the top surfaces. In this event, the ground surface was smoothed as much as possible. (hereinabove, the flattening process)

Then, electroless plating was performed to form an electroless nickel plating layer (thickness: 0.4 µm) on the foregoing flat surface, thereby to obtain a conductive underlayer. The condition of the electroless nickel plating was the same as in Example 6. (hereinabove, the underlayer forming process)

Then, a Pd alloy film (thickness: 3 µm) was formed on the foregoing conductive underlayer. The electrolytic plating condition for this Pd alloy film was the same as in Example 6. Upon the electrolytic plating, the opposite surface relative to the Pd alloy film formation was coated with an insulating film. (hereinabove, the film forming process)

Then, the insulating film was peeled and removed, and further, the resin layer was dissolved to be removed using the following treatment bath (Desmear Bath manufactured by Shipley Corporation). (hereinabove, the removal process)

| <Treatment Condition of Desmear Bath> | | |
|---|---|---|
| Bath composition of swelling process: | MLB-211 Cup-Z | 20 vol % 10 vol % |
| Bath temperature of swelling process: | | 80° C. |
| Bath composition of roughening process: | MLB-213A MLB-213B | 10 vol % 15 vol % |
| Bath temperature of roughening process: | | 80° C. |

After the foregoing removal of the resin layer was finished, cutting into a size of 3 cm×3 cm was carried out to obtain a filter for hydrogen production.

Evaluation of Hydrogen Production Filter

The hydrogen production filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

EXAMPLE 9

Production of Thin Film Support Substrate

Like in Example 6, a thin film support substrate of the present invention was produced.

Production of Filter for Hydrogen Production

Ni strike plating (thickness: 0.01 µm) was applied to a copper base member having a thickness of 0.2 mm under the following condition.

| <Ni Strike Plating Condition> | |
|---|---|
| Bath composition: Nickel chloride | 300 g/L |
| Boric acid | 30 g/L |
| pH: | 2 |
| Liquid temperature: | 55 to 65° C. |
| Current density: | 10 A/dm$^2$ |

Then, a Pd alloy film (thickness: 3 µm) was formed on one surface of the copper base member applied with the foregoing Ni strike plating. The electrolytic plating condition for this Pd alloy film was the same as in Example 6. Upon the electrolytic plating, the opposite surface relative to the Pd alloy film formation was coated with an insulating film. (hereinabove, the film forming process)

Then, after peeling and removing the insulating film from the copper base member, the foregoing Pd alloy film was brought into contact with the top surfaces of the columnar convex portions of the thin film support substrate and, by applying a heat treatment at 1000° C. for 12 hours in a vacuum, the Pd alloy film and the top surfaces of the columnar convex portions were joined together by diffusion to thereby dispose the copper base member. (hereinabove, the diffusion joining process)

Then, the copper base member was removed by selective etching. (hereinabove, the removal process)

After the foregoing removal of the copper base member was finished, cutting into a size of 3 cm×3 cm was carried out to obtain a filter for hydrogen production.

Evaluation of Hydrogen Production Filter

The hydrogen production filter thus produced was mounted in a reformer, and a mixture of butane gas and steam was supplied to the Pd alloy film of the filter under the same condition as Example 1, thereby to measure CO concentrations and flow rates of hydrogen rich gas transmitted to the side of the porous base member of the filter. As a result, the CO concentrations immediately after the start of reforming up to a lapse of 300 hours were 8 to 10 ppm which were extremely low, and the flow rates of the hydrogen rich gas were 10 L/hour, and therefore, it was confirmed that the hydrogen production filter produced by the present invention was excellent in durability and hydrogen transmission efficiency.

INDUSTRIAL APPLICABILITY

As described above, the production method of the hydrogen production filter according to the present invention is suitable for producing a hydrogen production filter that is used in a reformer of a fuel cell so as to be capable of stably producing high purity hydrogen gas.

The invention claimed is:

1. A production method of a hydrogen production filter using a thin film support substrate, comprising a disposing step of disposing an insulating film on a surface of the thin film support substrate which is on an opposite side relative to a surface where columnar convex portions are formed, said thin film support substrate comprising a metal substrate, the plurality of columnar convex portions formed on one surface of said metal substrate, and a plurality of through holes formed at a portion where said columnar convex portions are not formed, so as to pierce said metal substrate, wherein an area of the columnar convex portion non-formed portion occupying on the columnar convex portion formed side is within the range of 20 to 90%, a copper plating step of forming a copper plating layer on the surface of said thin film support substrate where the columnar convex portions are formed, so as to fill up the inside of said through holes and cover said columnar convex portions, a flattening step of flat-removing said copper plating layer so as to expose top surfaces of said columnar convex portions and form the same flat surface with said top surfaces, a film forming step of forming a Pd alloy film by plating on the flat surface formed by the top surfaces of said columnar convex portions and said copper plating layer, and a removal step of removing the copper plating layer by selective etching after removal of said insulating film.

2. A production method of a hydrogen production filter according to claim 1, wherein the Pd alloy film is formed by electrolytic plating in said film forming step.

3. A production method of a hydrogen production filter according to claim 1, wherein, in said film forming step, thin films of respective components comprising a Pd alloy are first stacked in layers by plating, then a heat treatment is applied thereto to form the Pd alloy film by diffusion of the components.

4. A production method of a hydrogen production filter using a thin film support substrate, comprising a resin layer forming step of forming a resin layer on a surface of the thin film support substrate where columnar convex portions are formed, so as to fill up the inside of through holes of the thin film support substrate and cover said columnar convex portions, said thin film support substrate comprising a metal substrate, the plurality of columnar convex portions formed on one surface of said metal substrate, and the plurality of through holes formed at a portion where said columnar convex portions are not formed, so as to pierce said metal substrate, wherein an area of the columnar convex portion non-formed portion occupying on the columnar convex portion formed side is within the range of 20 to 90%, a flattening step of flat-removing said resin layer so as to expose top surfaces of said columnar convex portions and form the same flat surface with said top surfaces, an underlayer forming step of forming a conductive underlayer by either of electroless plating and a vacuum film forming method on the flat surface formed by the top surfaces of said columnar convex portions and said resin layer, a film forming step of forming a Pd alloy film by plating on said conductive underlayer, and a removal step of dissolving and removing only said resin layer.

5. A production method of a hydrogen production filter according to claim 4, wherein the Pd alloy film is formed by electrolytic plating in said film forming step.

6. A production method of a hydrogen production filter according to claim 4, wherein, in said film forming step, thin films of respective components comprising a Pd alloy are first stacked in layers by plating, then a heat treatment is applied thereto to form the Pd alloy film by diffusion of the components.

7. A production method of a hydrogen production filter according to claim 2, wherein, in said film forming step, thin films of respective components comprising a Pd alloy are first stacked in layers by plating, then a heat treatment is applied thereto to form the Pd alloy film by diffusion of the components.

8. A production method of a hydrogen production filter according to claim 5, wherein, in said film forming step, thin films of respective components comprising a Pd alloy are first stacked in layers by plating, then a heat treatment is applied thereto to form the Pd alloy film by diffusion of the components.

* * * * *